United States Patent
Kobayashi et al.

(10) Patent No.: US 8,190,159 B2
(45) Date of Patent: May 29, 2012

(54) MOBILE TERMINAL, SERVER, AND COMMUNICATION SYSTEM

(75) Inventors: Hiroyuki Kobayashi, Osaka (JP); Makoto Hasegawa, Osaka (JP); Rikuo Takano, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 310 days.

(21) Appl. No.: 12/695,724

(22) Filed: Jan. 28, 2010

(65) Prior Publication Data

US 2010/0190501 A1 Jul. 29, 2010

(30) Foreign Application Priority Data

Jan. 29, 2009 (JP) .............................. P. 2009-017694

(51) Int. Cl.
*H04W 36/00* (2009.01)
*H04W 4/00* (2009.01)

(52) U.S. Cl. ......... 455/436; 370/331; 455/437; 455/438

(58) Field of Classification Search .................. 370/331, 370/332; 455/436, 437, 438, 439
See application file for complete search history.

(56) References Cited

U.S. PATENT DOCUMENTS

| | | | |
|---|---|---|---|
| 2007/0004411 A1* | 1/2007 | Goldman et al. | 455/436 |
| 2009/0131056 A1* | 5/2009 | Bontu et al. | 455/436 |
| 2009/0311993 A1* | 12/2009 | Horodezky | 455/412.2 |

FOREIGN PATENT DOCUMENTS

JP 2005-057397 3/2005

* cited by examiner

*Primary Examiner* — Nick Corsaro
*Assistant Examiner* — Michael S Bush
(74) *Attorney, Agent, or Firm* — Morgan, Lewis & Bockius LLP

(57) ABSTRACT

A mobile terminal is configured to perform a hard handover process to switch a base station to which the mobile terminal is connected from among a plurality of base stations and to perform wireless communication with the base station to which the mobile terminal is connected. A terminal-side counting section is configured to perform a counting process for counting time until a session established for wireless communication with the base station is timed out. A terminal-side application processing section is configured to perform a predetermined application process for the mobile terminal. A start signal transmitting section is configured to transmit a handover start signal indicating the start of the hard handover process. An end signal transmitting section is configured to transmit a handover end signal indicating the end of the hard handover process. A terminal-side counting process controlling section controls the progress of the counting process by the terminal-side counting section such that the timeout does not occur during a period from receiving the handover start signal to receiving the handover end signal. The terminal-side application process controlling section interrupts the application process by the terminal-side application processing section during the period.

7 Claims, 14 Drawing Sheets

MOBILE TERMINAL, SERVER, AND COMMUNICATION SYSTEM

The disclosure of Japanese Patent Application No. 2009-017694 filed on Jan. 29, 2009 including specification, drawings and claims is incorporated herein by reference in its entirety.

BACKGROUND

The present invention relates to a mobile terminal, a server, and a communication system.

Related-art mobile terminals perform wireless communication with a base station to view or listen to, for example, Web pages or motion picture streams which are distributed from a server connected to the base station. When the mobile terminal is moved to the boundary between the cells and the reception conditions thereof deteriorate, the mobile terminal performs a handover process to be connected to another base station with good reception conditions.

However, a mobile WiMAX terminal conforming to a mobile WiMAX (Worldwide Interoperability for Microwave Access) standard which is one of the mobile communication systems performs a hard handover process to switch base stations connected thereto. In the hard handover process, the mobile terminal is disconnected from the currently connected base station, and then the mobile terminal is connected to another base station. Therefore, communication is temporarily interrupted during the hard handover process. The IP network that has been used before the WiMAX system is generally a wired communication system. In this case, communication is hardly interrupted during a session. In addition, in recent years, a soft handover process has generally been applied to a wireless network anchored by a mobile telephone (3G). In this case, even when the base stations are switched with the movement of the terminal, communication is hardly interrupted. Therefore, the current software based on these network techniques does not perform the flow control of processes (the existing software processes) corresponding to layers higher than the layer that performs the handover process. If the current software based on these network techniques is used without any change, when communication is interrupted, the existing software process is abnormally shut down, which results in an error. Therefore, it is difficult for a mobile terminal (that is, a mobile terminal that performs the hard handover process to switch base stations) conforming to the WiMAX system or a server that distributes content to the mobile terminal to use the existing software without any change, which results in a reduction in convenience.

Patent Document 1 discloses a device for controlling reliable data transmission in a data communication network which includes a mobile terminal. The device has a mobility interface which exists in an IP layer and transmits a notification signal to a layer (for example, a transport layer) higher than the IP layer when the IP layer starts changing a connection point to the data communication network and ends changing the connection point to the data communication network. That is, the device notifies the start and the end of the handover process to the upper layers.

Patent Document 1: JP-A-2005-57397

However, as in the device disclosed in Patent Document 1, the notification of the start and the end of the handover process to the upper layer merely discriminate the interruption of a session in the upper layer due to the network congestion conditions from the interruption of a session due to the connection point handoff conditions of one or more mobile terminals. It is difficult to solve the problem of the process (the existing software process) corresponding to the upper layer being abnormally shut down when communication is interrupted. Therefore, even when the device has a function to notify the start and the end of the handover process to the upper layer, it is difficult to apply the existing software to the mobile terminal that performs a hard handover process to switch base stations or servers that distributes content to the mobile terminal, without any change.

SUMMARY

It is therefore an object of at least one embodiment of the present invention to apply the existing software to a mobile terminal that performs a hard handover process to switch base stations, a server that distributes content to the mobile terminal, and a communication system including the mobile terminal and the server without any change, thereby improving convenience of use.

In order to achieve the above described object, according to a first aspect of at least one embodiment of the present invention, there is provided a mobile terminal which is configured to perform a hard handover process to switch a base station to which the mobile terminal is connected from among a plurality of base stations and to perform wireless communication with the base station to which the mobile terminal is connected, the mobile terminal comprising: a handover processing section configured to perform the hard handover process; a terminal-side counting section configured to perform a counting process for counting time until a session established for wireless communication with the base station is timed out; a terminal-side counting process controlling section configured to control the progress of the counting process by the terminal-side counting section; a terminal-side application processing section configured to perform a predetermined application process for the mobile terminal; and a terminal-side application process controlling section configured to control the progress of the application process by the terminal-side application processing section, wherein the handover processing section includes: a start signal transmitting section configured to transmit a handover start signal indicating the start of the hard handover process to the terminal-side counting process controlling section and the terminal-side application process controlling section before the hard handover process starts; and an end signal transmitting section configured to transmit a handover end signal indicating the end of the hard handover process to the terminal-side counting process controlling section and the terminal-side application process controlling section after the hard handover process ends, wherein the terminal-side counting process controlling section controls the progress of the counting process by the terminal-side counting section such that the timeout does not occur during a period from receiving the handover start signal transmitted from the start signal transmitting section to receiving the handover end signal transmitted from the end signal transmitting section, and wherein the terminal-side application process controlling section interrupts the application process by the terminal-side application processing section during the period from receiving the handover start signal transmitted from the start signal transmitting section to receiving the handover end signal transmitted from the end signal transmitting section.

The terminal-side counting process controlling section may interrupt the counting process by the terminal-side counting section during the period from receiving the handover start signal transmitted from the start signal transmitting section to receiving the handover end signal transmitted from the end signal transmitting section.

The terminal-side counting process controlling section may extend the time until the session is timed out during the period from receiving the handover start signal transmitted from the start signal transmitting section to receiving the handover end signal transmitted from the end signal transmitting section.

According to a second aspect of at least one embodiment of the present invention, there is provided a server which is connectable to a plurality of base stations through a network and configured to communicate with a base station to which a mobile terminal is connected to distribute a content to the mobile terminal through the base station, the mobile terminal configured to perform a hard handover process to switch the base station to which the mobile terminal is connected from among the base stations, the server comprising: a receiving section configured to receive a handover start signal indicating the start of the hard handover process and a handover end signal indicating the end of the hard handover process, which are transmitted from the mobile terminal; a server-side counting section configured to perform a counting process for counting time until a session established for communication with the base station to which the mobile terminal is connected is timed out; a server-side counting process controlling section configured to control the progress of the counting process by the server-side counting section; a server-side application processing section configured to perform a predetermined application process for the server; and a server-side application process controlling section configured to control the progress of the application process by the server-side application processing section, wherein the server-side counting process controlling section controls the progress of the counting process by the server-side counting section such that the timeout does not occur during a period from when the receiving section receives the handover start signal to when the receiving section receives the handover end signal, and wherein the server-side application process controlling section interrupts the application process by the server-side application processing section during the period from when the receiving section receives the handover start signal to when the receiving section receives the handover end signal.

The server-side counting process controlling section may interrupt the counting process by the server-side counting section during the period from when the receiving section receives the handover start signal to when the receiving section receives the handover end signal.

The server-side counting process controlling section may extend the time until the session is timed out during the period from when the receiving section receives the handover start signal to when the receiving section receives the handover end signal.

According to a third aspect of at least one embodiment of the present invention, there is provided a communication system comprising: a plurality of base stations; a mobile terminal which is configured to perform a hard handover process to switch a base station to which the mobile terminal is connected from among the base stations and to perform wireless communication with the base station to which the mobile terminal is connected; and a server which is connectable to the base stations through a network and configured to communicate with the base station to which the mobile terminal is connected to distribute a content to the mobile terminal through the base station, wherein the mobile terminal includes: a handover processing section configured to perform the hard handover process; a terminal-side counting section configured to perform a first counting process for counting time until a session established for wireless communication with the base station is timed out; a terminal-side counting process controlling section configured to control the progress of the first counting process by the terminal-side counting section; a terminal-side application processing section configured to perform a first application process for the mobile terminal; and a terminal-side application process controlling section configured to control the progress of the first application process by the terminal-side application processing section, wherein the handover processing section includes: a start signal transmitting section configured to transmit a handover start signal indicating the start of the hard handover process to the terminal-side counting process controlling section, the terminal-side application process controlling section and the server before the hard handover process starts; and an end signal transmitting section configured to transmit a handover end signal indicating the end of the hard handover process to the terminal-side counting process controlling section, the terminal-side application process controlling section and the server after the hard handover process ends, wherein the terminal-side counting process controlling section controls the progress of the first counting process by the terminal-side counting section such that the timeout does not occur during a period from receiving the handover start signal transmitted from the start signal transmitting section to receiving the handover end signal transmitted from the end signal transmitting section, wherein the terminal-side application process controlling section interrupts the first application process by the terminal-side application processing section during the period from receiving the handover start signal transmitted from the start signal transmitting section to receiving the handover end signal transmitted from the end signal transmitting section, wherein the server includes: a receiving section configured to receive the handover start signal transmitted from the start signal transmitting section and the handover end signal transmitted from the end signal transmitting section; a server-side counting section configured to perform a second counting process for counting time until a session established for communication with the base station to which the mobile terminal is connected is timed out; a server-side counting process controlling section configured to control the progress of the second counting process by the server-side counting section; a server-side application processing section configured to perform a second application process for the server; and a server-side application process controlling section configured to control the progress of the second application process by the server-side application processing section, wherein the server-side counting process controlling section controls the progress of the second counting process by the server-side counting section such that the timeout does not occur during a period from when the receiving section receives the handover start signal to when the receiving section receives the handover end signal, and wherein the server-side application process controlling section interrupts the second application process by the server-side application processing section during the period from when the receiving section receives the handover start signal to when the receiving section receives the handover end signal.

The mobile terminal according to at least one aspect of the present invention includes the terminal-side counting process controlling section for controlling the progress of the counting process by the terminal-side counting section and the terminal-side application process controlling section for controlling the progress of the application process by the terminal-side application processing section. The terminal-side counting process controlling section controls the progress of the counting process by the terminal-side counting section such that a session timeout does not occur during the period from receiving the handover start signal to receiving the handover end signal. The terminal-side application process controlling section interrupts the application process by the terminal-side application processing section during the period from receiving the handover start signal to receiving the handover end signal.

In the mobile terminal, a session timeout does not occur while the hard handover process is being performed. Therefore, the existing software process is not abnormally shut down due to the session timeout. In the mobile terminal, the application process is interrupted while the hard handover process is being performed. Therefore, the existing software process is not abnormally shut down due to, for example, a buffer underflow. Therefore, it is possible to use the existing software without any change, which results in an increase in convenience.

The server according to at least one aspect of the present invention includes: the receiving section for receiving the handover start signal and the handover end signal which are transmitted from the mobile terminal; the server-side counting process controlling section for controlling the progress of the counting process by the server-side counting section; and the server-side application process controlling section for controlling the progress of the application process by the server-side application processing section. The server-side counting process controlling section controls the progress of the counting process by the server-side counting section such that a session timeout does not occur during the period from when the receiving section receives the handover start signal to when the receiving section receives the handover end signal. The server-side application process controlling section interrupts the application process by the server-side application processing section during the period from when the receiving section receives the handover start signal to when the receiving section receives the handover end signal.

In the server, no session timeout occurs during the period from the reception of the handover start signal to the reception of the handover end signal (while the mobile terminal is performing the hard handover process). Therefore, the existing software process is not abnormally shut down due to a session timeout. In addition, in the server, the application process is interrupted during the period from the reception of the handover start signal to the reception of the handover end signal. Therefore, the existing software process is not abnormally shut down due to, for example, a buffer overflow. Therefore, it is possible to use the existing software without any change, which results in an increase in convenience.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Figure 1:
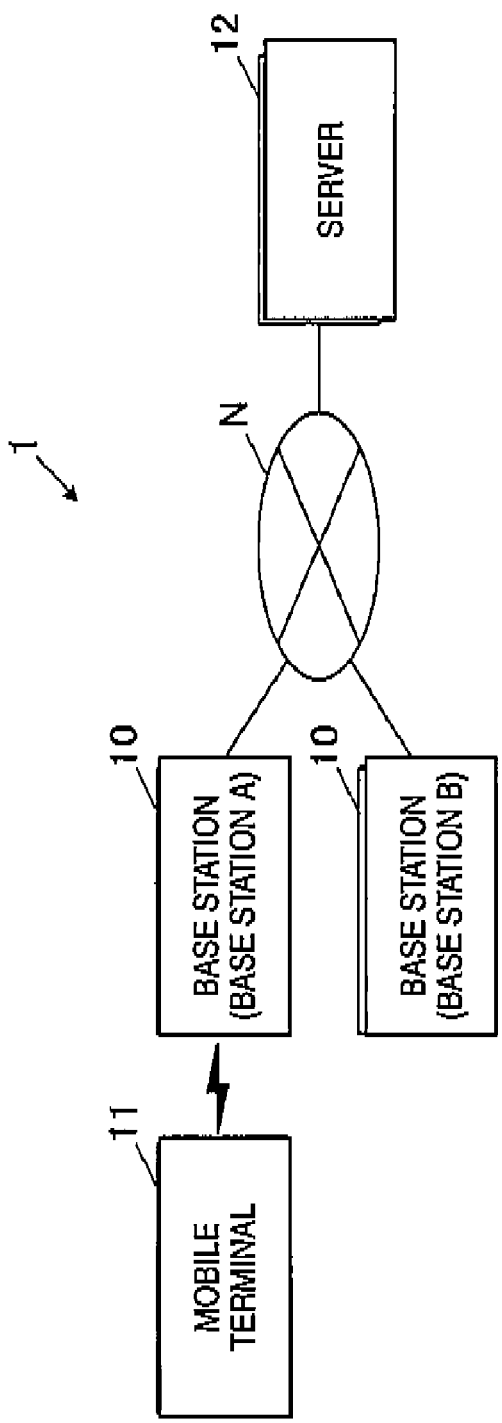
FIG. 1 is a diagram illustrating the structure of a communication system according to a first embodiment.

Embodiments of the invention will be described with reference to the accompanying drawings.

Hereinafter, exemplary embodiments of the invention will be described in detail with reference to the accompanying drawings. The scope of the invention is not limited to the examples shown in the drawings.

[First Embodiment]

First, a mobile terminal 11, a server 12, and a communication system 1 according to a first embodi ment will be described.

<Communication System>

As shown in FIG. 1, the communication system 1 includes, for example, a plurality of base stations 10, a mobile terminal 11 that performs wireless communication (mobile WiMAX communication) with one base station 10 connected thereto among the plurality of base stations 10, and a server 12 that is connected to the plurality of base stations 10 through a network N, such as a WAN (Wide Area Network), and distributes content to the mobile terminal 11 through the network N and the base stations 10.

Figure 2:
FIG. 2 is a diagram illustrating a communication protocol used in the communication system according to the first embodiment.

As shown in FIG. 2, a communication protocol used in the communication system 1 is configured on the basis of, for example, a TCP/IP 5 layer hierarchical model including five layers; that is, a physical layer, a MAC (Media Access Control) layer, an IP (Internet Protocol) layer, a TCP/UDP (Transmission Control Protocol/User Datagram Protocol) layer, and an application layer. The physical layer is the lowermost layer and corresponds to the physical layer of the OSI (Open Systems Interconnection) reference model. The MAC layer is above the physical layer and corresponds to the data link layer of the OSI reference model. The IP layer is above the MAC layer and corresponds to the network layer of the OK reference model. The TCP/UDP layer is above the IP layer and corresponds to the transport layer of the OK reference model. The application layer is the uppermost layer and corresponds to the session layer, the presentation layer, and the application layer of the OSI reference model.

<Base Station>

The base station 10 is a mobile WiMAX base station that performs mobile WiMAX communication with the mobile terminal 11. Specifically, the base station 10 transmits data received from the mobile terminal 11 by the mobile WiMAX communication (for example, a contents request signal) to the server 12 through the network N, or transmits data (for example, contents) received from the server 12 through the network N to the mobile terminal 11 using the mobile WiMAX communication.

<Mobile Terminal>

The mobile terminal 11 is a mobile WiMAX terminal that performs the mobile WiMAX communication with the base station 10. Specifically, the mobile terminal 11 performs a hard handover process to select one base station 10 to be connected thereto among the plurality of base stations 10 and performs the mobile WiMAX communication with the connected base station 10.

Figure 3:
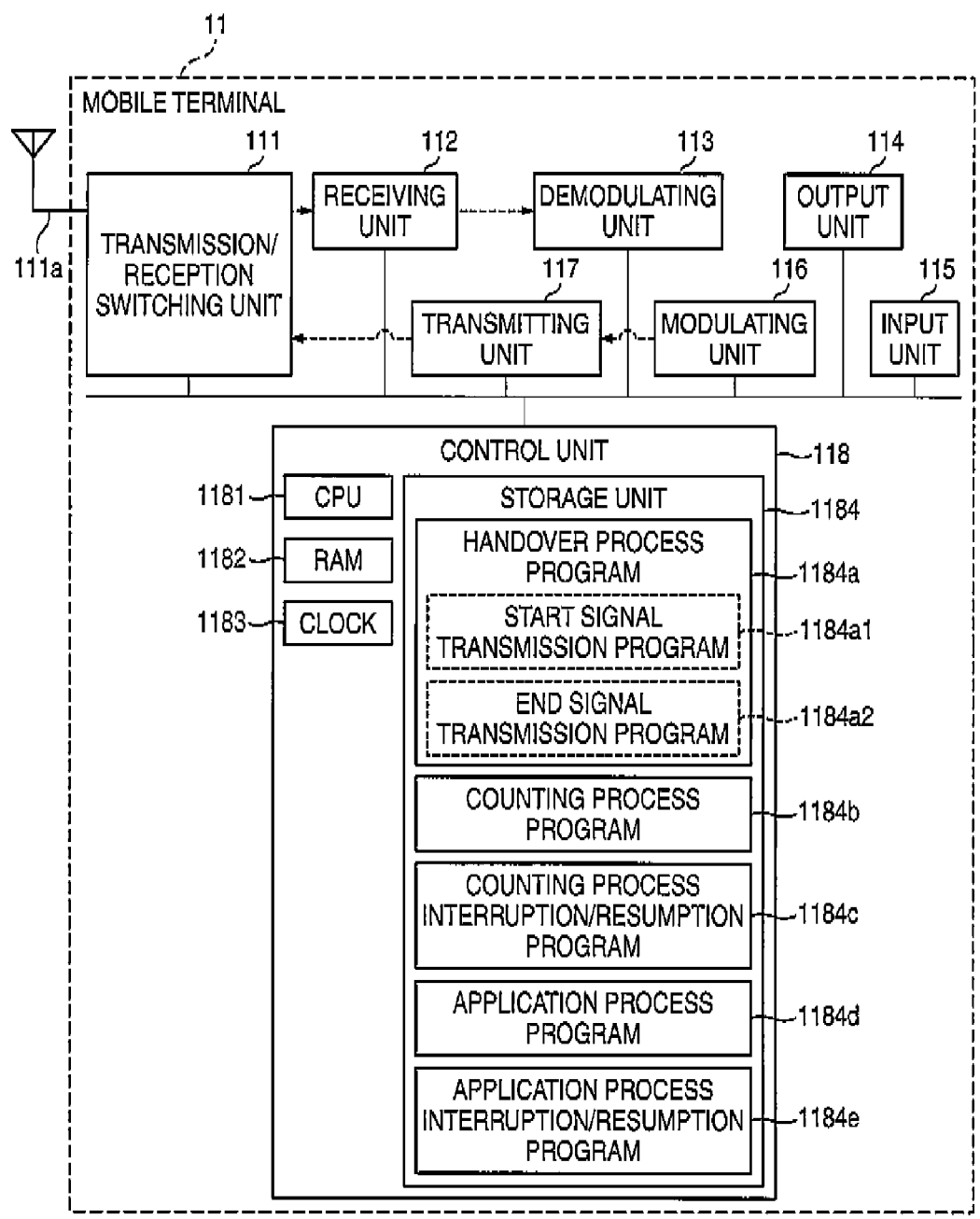
FIG. 3 is a diagram illustrating the functional structure of a mobile terminal according to the first embodiment.
Figure 4:
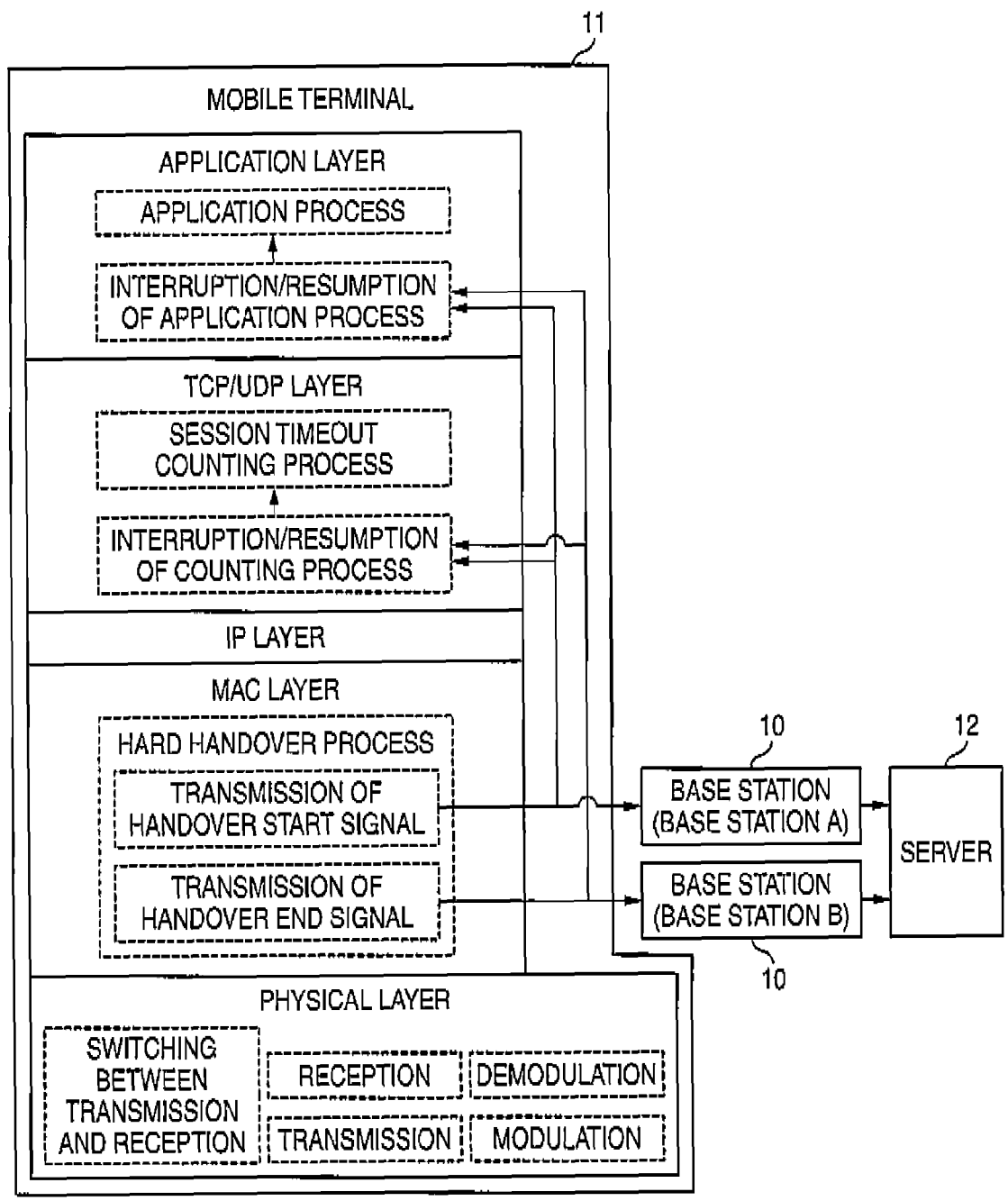
FIG. 4 is a diagram illustrating the layer structure of the mobile terminal according to the first embodiment.

For example, as shown in FIG. 3, the mobile terminal 11 includes a transmission/reception switching unit 111 including an antenna 111a, a receiving unit 112, a demodulating unit 113, an output unit 114, an input unit 115, a modulating unit 116, a transmitting unit 117, and a control unit 118. In the mobile terminal 11, for example, as shown in FIGS. 3 and 4, the transmission/reception switching unit 111, the receiving unit 112, the demodulating unit 113, the modulating unit 116, and the transmitting unit 117 perform a process corresponding to the physical layer, and the control unit 118 performs processes corresponding to the MAC layer, the IP layer, the TCP/UDP layer, and the application layer. That is, in the mobile terminal 11, the process corresponding to the physical layer is a hardware process, and the processes corresponding to the MAC layer, the IP layer, the TCP/UDP layer, and the application layer are software processes.

The difference between the mobile terminal 11 and the mobile terminal according to the related art that performs a soft handover process to switch base stations connected thereto will be described. The mobile terminal according to the related art includes the physical layer and the MAC layer conforming to wireless communication (for example, CDMA (Code Division Multiple Access) for switching the base stations using the soft handover process. In contrast, the mobile terminal 11 includes the physical layer and the MAC layer conforming to mobile WiMAX communication.

In the mobile terminal 11, the software (the existing software) included in the mobile terminal according to the related art is applied to the layers (the IP layer, the TCP/UDP layer, and the application layer) above the MAC layer that performs the handover process, without any change. However, the mobile terminal according to the related art performs the soft handover process to switch base stations and the communication of the mobile terminal with the base station during the handover process is not interrupted. Therefore, the existing software is configured without considering that communication with the base station is interrupted. When communication with the base station is interrupted while the existing software process is being executed, a session timeout occurs and the existing software process is abnormally shut down. In addition, when communication with the base station is interrupted while the existing software process is being executed, for example, a buffer underflow occurs in the application layer, and the existing software process is abnormally shut down. Therefore, the mobile terminal 11 includes software (counting process interruption/resumption program 1184c) for allowing a CPU 1181 to control a session timeout counting process and software (application process interruption/resumption program 1184e) for allowing the CPU 1181 to control the progress of an application process, in addition to the existing software.

The reception/transmission switching unit 111 periodically switches an operation mode between a mode in which data is transmitted to the base station 10 and a mode in which data is received from the base station 10. In the data transmission mode, data input from the transmitting unit 117 is transmitted to the base station 10. In the data reception mode, data transmitted from the base station 10 is output to the receiving unit 112.

The receiving unit 112 outputs the data input from the transmission/reception switching unit 111 to the demodulating unit 113.

The demodulating unit 113 demodulates the data input from the receiving unit 112 and outputs the demodulated data to the control unit 118.

The output unit 114 includes an image display unit or a voice output unit, and outputs the content transmitted from the server 12 through the base station 10 such that the user can view and listen to the content. Specifically, the image display unit of the output unit 114 is, for example, a liquid crystal display device and displays an image on the basis of the content transmitted from the server 12. The voice output unit of the output unit 114 is, for example, a speaker, and outputs a voice on the basis of the content transmitted from the server 12.

The input unit 115 includes a cursor key, character/number keys, and various function keys, and outputs a push signal to a control unit 118 when the user pushes a key. The input unit 115 may include other input devices, such as a touch panel that is formed integrally with an image display unit provided in the output unit 114.

The modulating unit 116 modulates predetermined data input from the control unit 118 and outputs the modulated data to the transmitting unit 117. The predetermined data input from the control unit 118 is, for example, data created by the control unit 118 on the basis of the push signal from the input unit 115. Specifically, the predetermined data is, for example, a content request signal for requesting the server 12 to distribute user's desired content.

The transmitting unit 117 outputs the data input from the modulating unit 116 to the transmission/reception switching unit 111.

For example, as shown in FIG. 3, the control unit 118 includes a CPU (Central Processing Unit) 1181, a RAM (Random Access Memory) 1182, a clock 1183, and a storage unit 1184.

For example, the CPU 1181 performs various kinds of control operations according to various kinds of processing programs for the mobile terminal 11 that are stored in the storage unit 1184.

The RAM 1182 includes, for example, a program storage area for expanding the processing program executed by the CPU 1181 or a data storage area that stores input data or the process results obtained when the processing program is executed.

The clock 1183 generates, for example, a clock signal for synchronization with various processes or a timer.

The storage unit 1184 stores, for example, a system program that can be executed by the mobile terminal 11, various kinds of processing programs that can be executed by the system program, data used when these various kinds of processing programs are executed, and data of the process result of the CPU 1181. The programs are stored in the storage unit 1184 in the form of computer readable program codes.

Specifically, as shown in FIG. 3, the storage unit 1184 includes, for example, a handover process program 1184a, a counting process program 1184b, a counting process interruption/resumption program 1184c, an application process program 1184d, and an application process interruption/resumption program 1184e.

The handover process program 1184a allows the CPU 1181 to perform the hard handover process. As shown in FIG. 4, for example, the hard handover process is included in the process corresponding to the MAC layer.

Specifically, the CPU 1181 is connected to the base station 10 (for example, a base station A) under the best reception conditions among the plurality of base stations 10, establishes a session, and determines whether the current reception conditions are bad. If it is determined that the current reception conditions are bad, the CPU 1181 selects the base station 10 (for example, base station B) under the best reception conditions from the plurality of base stations 10, is disconnected from the currently connected base station 10 (base station A), is connected to the selected base station 10 (base station B) and establishes a session. More specifically, for example, when the reception conditions are less than a predetermined allowable level, the CPU 1181 determines that the reception conditions are bad. When it is determined that the current reception conditions are bad, for example, the CPU 1181 selects the base station 10 to be connected thereto among the base stations 10 whose reception conditions are more than the predetermined allowable level. The CPU 1181 executes the handover process program 1184a to function as a handover processing unit.

As shown in FIG. 3, the handover process program 1184a includes, for example, a start signal transmission program 1184a1 and an end signal transmission program 1184a2.

The start signal transmission program 1184a1 allows the CPU 1181 to perform a function of transmitting a handover start signal indicating the start of the hard handover process to the layers above the MAC layer that performs the handover process before the hard handover process is performed. Specifically, the CPU 1181 transmits the handover start signal to the CPU 1181 that executes the counting process interruption/resumption program 1184c or the CPU 1181 that executes the application process interruption/resumption program 1184e.

When the communication between the mobile terminal 11 and the base station 10 is interrupted, an error is likely to occur in the server 12 according to the kind of application process executed by the mobile terminal 11 (CPU 1181). When an application process is performed with an error occurring in the server 12 due to the interruption of the communication between the mobile terminal 11 and the base station 10, the CPU 1181 also transmits the handover start signal to the server 12. Specifically, the communication between the mobile terminal 11 and the base station 10 is interrupted while the mobile terminal 11 performs an application process for controlling the output unit 114 to output a motion picture stream distributed from the server 12 such that the user can view the motion picture stream (that is, while the user of the mobile terminal 11 views the motion picture stream with the mobile terminal 11). In this case, the server 12 attempts to continuously transmit the distributed content to the end even though there is no content distribution destination (recipient). Therefore, for example, a buffer overflow occurs in the server 12 and an error, such as an abnormal shutdown, occurs in the executed software process. In addition, in this case, for example, a session timeout occurs in the server 12, and an error, such as an abnormal shutdown, occurs in the executed software process. Therefore, the CPU 1181 also transmits the handover start signal to the server 12, for example, while an application process for allowing the output unit 114 to output the motion picture stream distributed from the server 12 such that the user can view the motion picture stream is being performed.

In contrast, for example, the CPU 1181 does not transmit the handover start signal to the server 12 when an application process for allowing the output unit 114 to output the content, such as a Web page, distributed from the server 12 such that the user can view the content (that is, while the server 12 is performing an application process that does not cause the abnormal shutdown of a software process due to a buffer overflow or a session timeout). The CPU 1181 executes the start signal transmission program 1184a1 to function as a start signal transmitting unit.

The end signal transmission program 1184a2 allows the CPU 1181 to transmit a handover end signal indicating the end of the hard handover process to the layers above the MAC layer that performs the handover process after the handover process ends. Specifically, the CPU 1181 transmits the handover end signal to the CPU 1181 that has executed the counting process interruption/resumption program 1184c or the CPU 1181 that had executed the application process interruption/resumption program 1184e. When the handover start signal is also transmitted to the server 12 before the hard handover process starts, the CPU 1181 also transmits the handover end signal to the server 12 after the hard handover process ends. The CPU 1181 performs the end signal transmission program 1184a2 to function as an end signal transmitting unit.

Figure 6:
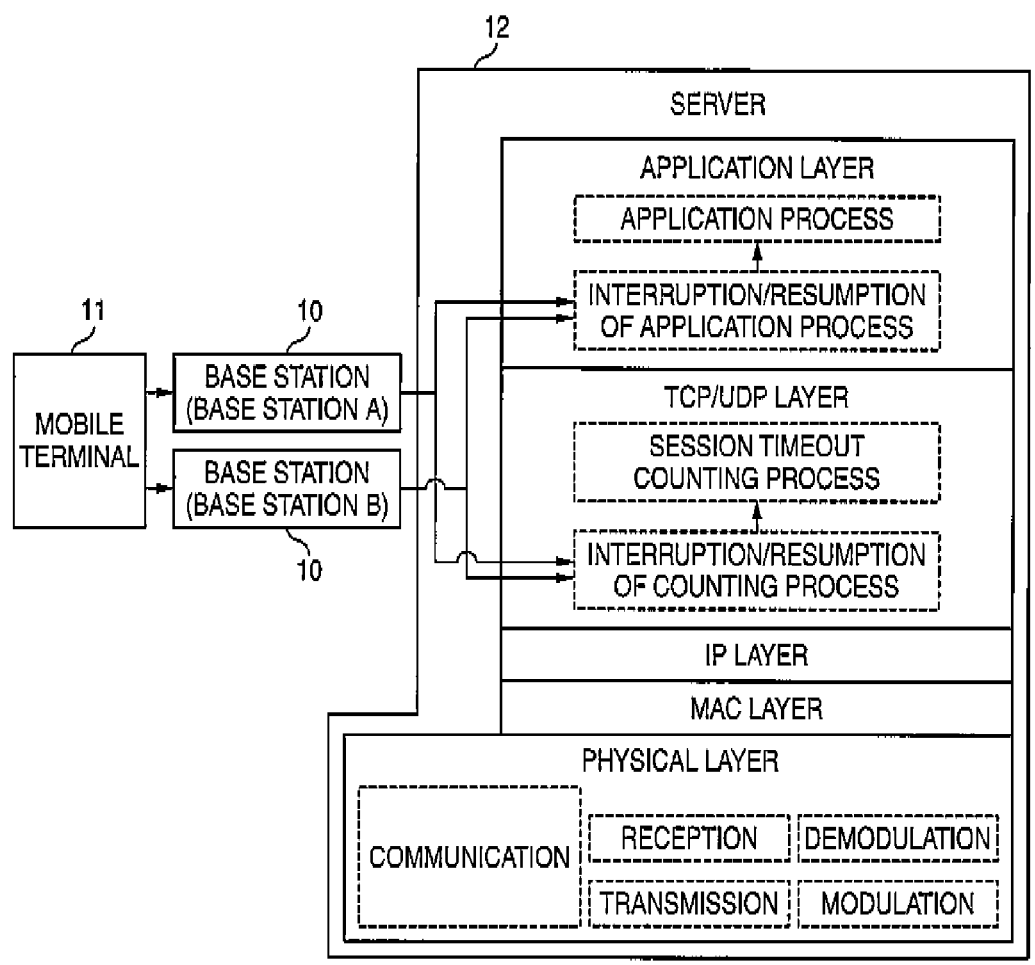
FIG. 6 is a diagram illustrating the layer structure of the server according to the first embodiment.

The handover start signal and the handover end signal are transmitted to the server 12 through the base station 10. Specifically, for example, when the mobile terminal 11 performs the bard handover process to switch the base station 10 that is connected thereto from the base station A to the base station B, as shown in FIGS. 4 and 6, the handover start signal is transmitted to the server 12 through the base station A (the base station 10 connected to the mobile terminal before the handover process is performed), and the handover end signal is transmitted to the server 12 through the base station B (the base station 10 connected to the mobile terminal after the handover process is performed).

The sentence "the CPU 1181 transmits the handover start signal to the CPU 1181 that executes the counting process interruption/resumption program 1184c or the CPU 1181 that executes the application process interruption/resumption program 1184e" means that the handover start signal is generated as a trigger for starting the execution of the counting process interruption/resumption program 1184c or the application process interruption/resumption program 1184e. The sentence "the CPU 1181 transmits the handover end signal to the CPU 1181 that has executed the counting process interruption/resumption program 1184c or the CPU 1181 that had executed the application process interruption/resumption program 1184e" means that the handover end signal is generated as a trigger for ending the execution of the counting process interruption/resumption program 1184c or the application process interruption/resumption program 1184e.

The counting process program 1184b allows the CPU 1181 to perform a session timeout counting process of counting the time until the session established for mobile WiMAX communication with the base station 10 is timed out. For example, as shown in FIG. 4, the session timeout counting process is included in a process corresponding to the TCP/UDP layer.

Specifically, when transmitting data to the base station 10, the CPU 1181 starts the session timeout counting process and counts (for example, counts down) the time until the session is timed out on the basis of for example, the clock signal generated by the clock 1183. When receiving data from the base station 10 before the time until the session is timed out becomes zero (for example, before the time until the session is timed out reaches "0 second"), the CPU 1181 ends the session timeout counting process. On the other hand, when the time until the session is timed out becomes zero before data is received from the base station 10, the CPU 1181 ends the session timeout counting process and terminates the session established with the base station 10. The CPU 1181 performs the counting process program 1184b to function as a terminal-side counting unit.

The counting process interruption/resumption program 1184c (counting process interruption/resumption daemon) allows the CPU 1181 to perform a process of controlling the progress of the session timeout counting process performed by the CPU 1181 that has executed the counting process program 1184b. Specifically, the CPU 1181 controls the progress of the session timeout counting process performed by the CPU 1181 that has executed the counting process program 1184b such that a session timeout does not occur during the period from the reception of the handover start signal to the transmission of the handover end signal.

More specifically, the CPU 1181 interrupts the session timeout counting process performed by the CPU 1181 that has executed the counting process program 1184b during the period from the reception of the handover start signal to the generation of the handover end signal. That is, the CPU 1181 starts the execution of the counting process interruption/resumption program 1184c and interrupts the session timeout counting process, using the generation of the handover start signal as a trigger. In addition, the CPU 1181 ends the execution of the counting process interruption/resumption program 1184c and resumes the interrupted session timeout counting process, using the generation of the handover end signal as a trigger. When the session timeout counting process is not interrupted during the hard handover process, a session timeout occurs and the software process being executed is likely to be abnormally shut down. However, in the mobile terminal 11, while the hard handover process is being performed, the session timeout counting process is interrupted. Therefore, the above-mentioned error does not occur, which is preferable.

In this case, when the session timeout counting process is resumed, the time until the session is timed out may be continuously counted from the time when the process is interrupted, or a time longer than the time until the session is timed out from the time when the process is interrupted may be set and counted. That is, for example, it is assumed that the timeout is 5 minutes and the time until the session is timed out is counted (counted down) at an interval of one second, such as 4 minutes and 59 seconds→4 minutes and 58 seconds→4 minutes and 57 seconds→ . . . . When the session timeout counting process is interrupted at 2 minutes 30 seconds, the counting of the time until the session is timed out may be resumed from the time when the session timeout counting process is interrupted, such as 2 minutes and 29 seconds→2 minutes and 28 seconds→2 minutes and 27 seconds→ . . . , or a time (for example, 3 minutes) longer than the time until the session is timed out from the time when the process is interrupted may be set and the counting of the time may be resumed such as 2 minutes and 59 seconds→2 minutes and 58 seconds→2 minutes and 57 seconds→ . . . .

The "process of setting the time longer than the time until the session is timed out from the time when the process is interrupted and resuming the counting" includes a process of resetting the time until the session is timed out and then counting the time. That is, a time (for example, timeout) longer than the time until the session is timed out from the time when the process is interrupted may be set, and the counting of the time may be resumed such as 4 minutes and 59 seconds→4 minutes and 58 seconds→4 minutes and 57 seconds→ . . . .

The CPU 1181 executes the counting process interruption/resumption program 1184c to function as a terminal-side counting process control unit.

The application process program 1184d allows the CPU 1181 to perform a predetermined application process for the mobile terminal 11. For example, as shown in FIG. 4, the application process is included in a process corresponding to the application layer.

Specifically, the predetermined application process for the mobile terminal 11 includes, for example, a process of outputting the Web page or content, such as a motion picture stream, distributed from the server 12 to the output unit 114 such that the user can view or listen to the Web page or the content. The CPU 1181 executes the application process program 1184d to function as a terminal-side application processing unit.

The application process interruption/resumption program 1184e (application process interruption/resumption daemon) allows the CPU 1181 to perform a process of controlling the progress of the application process performed by the CPU 1181 that has executed the application process program 1184d.

Specifically, the CPU 1181 interrupts the application process performed by the CPU 1181 that has executed the application process program 1184d during the period from the reception of the handover start signal to the reception of the handover end signal (that is, the period from the generation of the handover start signal to the generation of the handover end signal). That is, the CPU 1181 starts the execution of the application process interruption/resumption program 1184e and interrupts the application process, using the generation of the handover start signal as a trigger. In addition, the CPU 1181 ends the execution of the application process interruption/resumption program 1184e and resumes the interrupted application process, using the generation of the handover end signal as a trigger. When the application process is not interrupted during the hard handover process, a buffer underflow occurs and the software process being executed is likely to be abnormally shut down. However, in the mobile terminal 11, while the hard handover process is being performed, the application process is interrupted. Therefore, the above-mentioned error does not occur, which is preferable.

In this case, when the application process is resumed, the CPU 1181 continuously performs the application process from the time when the application process is interrupted. The CPU 1181 executes the application process interruption/resumption program 1184e to function as a terminal-side application process control unit.

<Server>

The server 12 is a content distribution server that distributes content to the mobile terminal 11. The server 12 performs communication with the base station 10 connected to the mobile terminal 11 through the network N to distribute content to the mobile terminal 11.

Figure 5:
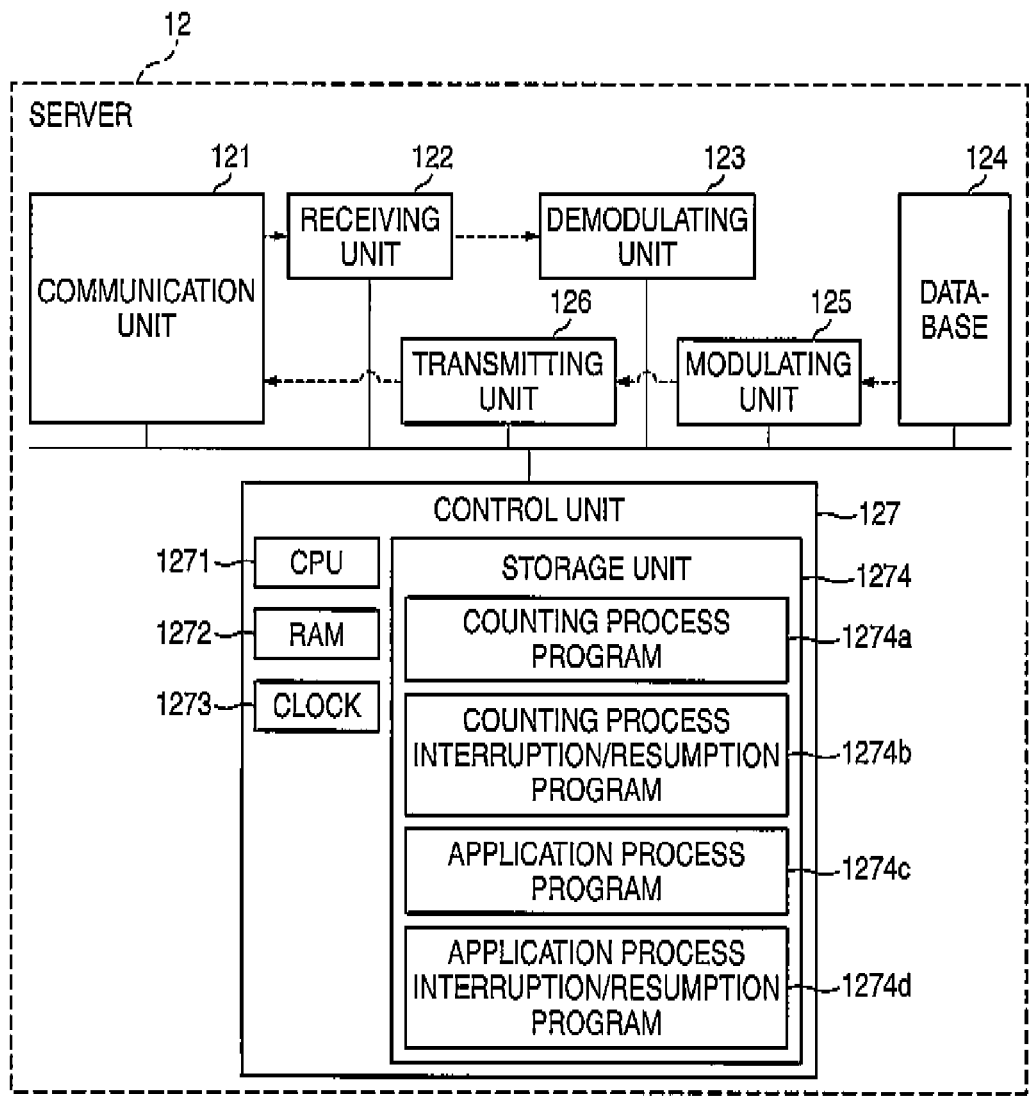
FIG. 5 is a diagram illustrating the functional structure of a server according to the first embodiment.

For example, as shown in FIG. 5, the server 12 includes a communication unit 121, a receiving unit 122, a demodulating unit 123, a database 124, a modulating unit 125, a transmitting unit 126, and a control unit 127. For example, as shown in FIGS. 5 and 6, in the server 12, the communication unit 121, the receiving unit 122, the demodulating unit 123, the modulating unit 125, and the transmitting unit 126 perform the process corresponding to the physical layer, and the control unit 127 performs the processes corresponding to the MAC layer, the IP layer, the TCP/UDP layer, and the application layer. That is, in the server 12, the process corresponding to the physical layer is a hardware process, and the processes corresponding to the MAC layer, the IP layer, the TCP/UDP layer, and the application layer are software processes.

Next the difference between the server 12 and the server according to the related art that distributes content to the mobile terminal which performs a soft handover process to switch the base stations connected thereto will be described. The server 12 uses the software (the existing software) included in the server according to the related art without any change. However, the mobile terminal, which is a content distribution destination, performs the soft handover process to switch the base stations, and the communication between the mobile terminal and the base station is not interrupted during the handover process. Therefore, the existing software included in the server according to the related art is configured assuming that the communication between the mobile terminal and the base station is interrupted. When the communication between the mobile terminal and the base station is interrupted while the existing software process is being executed, a session timeout occurs and the existing software process that is being performed is likely to be abnormally shut down. In addition, when the communication between the mobile terminal and the base station is interrupted while the existing software process is being executed, a buffer overflow occurs in the application layer and the existing software process that is being performed is likely to be abnormally shut down. Therefore, the server 12 includes software (counting process interruption/resumption program 1274b) that allows the CPU 1271 to control the progress of the session timeout counting process and software (application process interruption/resumption program 1274d) that allows the CPU 1271 to control the progress of the application process.

The communication unit 121 transmits or receives various kinds of information to or from an external apparatus (for example, the base station 10) through the network N. The communication unit 121 transmits data input from the transmitting unit 126 to the base station 10, and outputs data received from the base station 10 to the receiving unit 122.

The receiving unit 122 outputs the data input from the communication unit 121 to the demodulating unit 123. A receiving unit that receives the handover start signal and the handover end signal transmitted from the mobile terminal 11 includes the communication unit 121 and the receiving unit 122.

The demodulating unit 123 demodulates the data input from the receiving unit 122 and outputs the demodulated data to the control unit 127.

The data base 124 stores content to be distributed to, for example, the mobile terminal 11.

The modulating unit 125 modulates predetermined data input from the control unit 127 and outputs the modulated data to the transmitting unit 126. The data input from the control unit 127 includes, for example, the content acquired by the control unit 127 from the data base 124 in response to a content request signal from the mobile terminal 11.

The transmitting unit 126 outputs the data input from the modulating unit 125 to the communication unit 121.

For example, as shown in FIG. 5, the control unit 127 includes the CPU 1271, a RAM 1272, a clock 1273, and a storage unit 1274.

For example, the CPU 1271 performs various kinds of control operations according to various kinds of processing programs for the server 12 stored in the storage unit 1274.

The RAM 1272 includes, for example, a program storage area for expanding the processing program executed by the CPU 1271 or a data storage area that stores input data or the process results obtained when the processing program is executed.

The clock 1273 generates, for example, a clock signal for synchronization with various processes or a timer.

The storage unit 1274 stores, for example, a system program that can be executed by the server 12, various kinds of processing programs that can be executed by the system program, data used when these various kinds of processing programs are executed, and data of the process result of the CPU 1271. The programs are stored in the storage unit 1274 in the form of computer readable program codes.

Specifically, as shown in FIG. 5, the storage unit 1274 includes, for example, a counting process program 1274a, a counting process interruption/resumption program 1274b, an application process program 1274c, and an application process interruption/resumption program 1274d.

The counting process program 1274a allows the CPU 1271 to perform a session timeout counting process of counting the time until the session established for communication with the base station 10 is timed out. For example, as shown in FIG. 6, the session timeout counting process is included in a process corresponding to the TCP/UDP layer.

Specifically, when transmitting data to the base station 10, the CPU 1271 starts the session timeout counting process and counts (for example, counts down) the time until the session is timed out on the basis of, for example, the clock signal generated by the clock 1273. When receiving data from the base station 10 before the time until the session is timed out becomes zero (for example, before the time until the session is timed out reaches "0 second"), the CPU 1271 ends the session timeout counting process. On the other hand, when the time until the session is timed out becomes zero before data is received from the base station 10, the CPU 1271 ends the session timeout counting process and terminates the session established with the base station 10. The CPU 1271 performs the counting process program 1274a to function as a server-side counting unit.

The counting process interruption/resumption program 1274b (counting process interruption/resumption daemon) allows the CPU 1271 to perform a process of controlling the progress of the session timeout counting process performed by the CPU 1271 that has executed the counting process program 1274a. Specifically, the CPU 1271 controls the progress of the session timeout counting process performed by the CPU 1271 that has executed the counting process program 1274a such that a session timeout does not occur during the period from the reception of the handover start signal to the reception of the handover end signal by the communication unit 121 and the receiving unit 122.

More specifically, the CPU 1271 interrupts the session timeout counting process performed by the CPU 1271 that has executed the counting process program 1274a during the period from the reception of the handover start signal to the reception of the handover end signal by the communication unit 121 and the receiving unit 122. That is, the CPU 1271 starts the execution of the counting process interruption/resumption program 1274b and interrupts the session timeout counting process when the handover start signal generated in the mobile terminal 11 is received by the communication unit 121 and the receiving unit 122 and is then input to the control unit 127. In addition, the CPU 1271 ends the execution of the counting process interruption/resumption program 1274b and resumes the interrupted session timeout counting process when the handover end signal generated in the mobile terminal 11 is received by the communication unit 121 and the receiving unit 122 and is then input to the control unit 127.

When the session timeout counting process is not interrupted during the period from the reception of the handover start signal to the reception of the handover end signal by the communication unit 121 and the receiving unit 122, a session timeout occurs and the software process being executed is likely to be abnormally shut down. However, in the server 12, the session timeout counting process is interrupted during the period from the reception of the handover start signal to the reception of the handover end signal. Therefore, the above-mentioned error does not occur, which is preferable.

In this case, when the session timeout counting process is resumed, the time until the session is timed out may be continuously counted from the time when the process is interrupted, or a time longer than the time until the session is timed out from the time when the process is interrupted may be set and counted. The CPU 1271 executes the counting process interruption/resumption program 1274b to function as a server-side counting process control unit.

The application process program 1274c allows the CPU 1271 to perform a predetermined application process for the server 12. For example, as shown in FIG. 6, the application program is included in the process corresponding to the application layer.

Specifically, the predetermined application process for the server 12 includes, for example, a process of outputting a Web page or content, such as a motion picture stream, to the mobile terminal 11. The CPU 1271 executes the application process program 1274c to function as a server-side application processing unit.

The application process interruption/resumption program 1274d (application process interruption/resumption daemon) allows the CPU 1271 to perform a process of controlling the progress of the application process performed by the CPU 1271 that has executed the application process program 1274c.

Specifically, the CPU 1271 interrupts the application process performed by the CPU 1271 that has executed the application process program 1274c during the period from the reception of the handover start signal to the reception of the handover end signal by the communication unit 121 and the receiving unit 122. That is, the CPU 1271 starts the execution of the application process interruption/resumption program 1274d and interrupts the application process, when the handover start signal generated in the mobile terminal 11 is received by the communication unit 121 and the receiving unit 122 and is then input to the control unit 127. In addition, the CPU 1271 ends the execution of the application process interruption/resumption program 1274d and resumes the interrupted application process, when the handover end signal generated in the mobile terminal 11 is received by the communication unit 121 and the receiving unit 122 and is then input to the control unit 127.

When the application process is not interrupted during the period from the reception of the handover start signal to the reception of the handover end signal by the communication unit 121 and the receiving unit 122, a buffer overflow occurs and the software process being executed is likely to be abnormally shut down. However, in the server 12, since the application process is interrupted during the period from the reception of the handover start signal to the reception of the handover end signal, the above-mentioned error does not occur, which is preferable.

In this case, when the application process is resumed, the CPU 1271 continuously performs the application process from the time when the application process is interrupted. The CPU 1271 executes the application process interruption/resumption program 1274d to function as a server-side application process control unit.

<Communication Process>

Next, a communication process of the communication system 1 will be described.

(Communication Process of Mobile Terminal)

Figure 7:
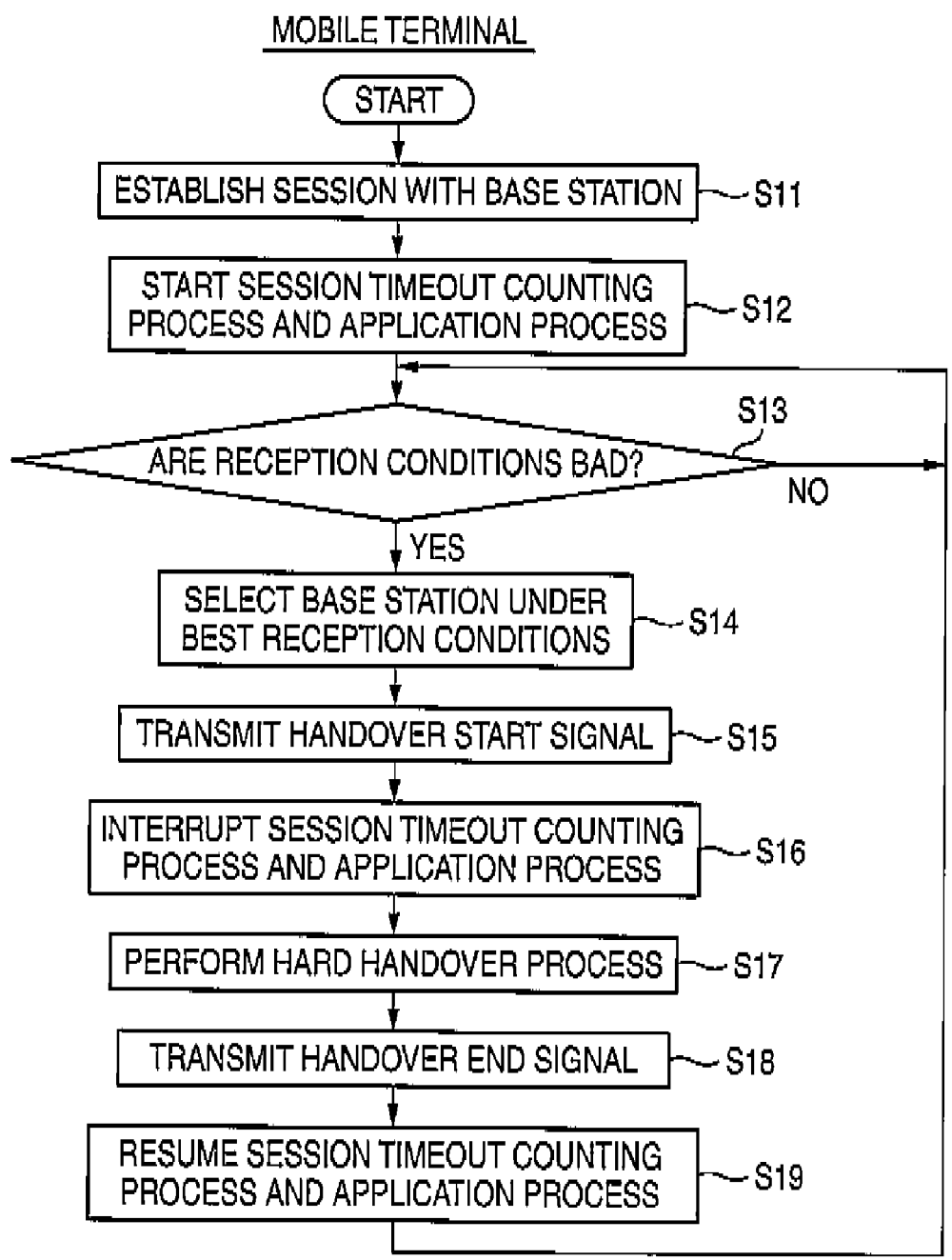
FIG. 7 is a flowchart illustrating a communication process of the mobile terminal with the server according to the first embodiment.

First, the communication process of the mobile terminal 11 with the server 12 will be described with reference to a flowchart shown in FIG. 7.

First, the CPU 1181 of the mobile terminal 11 is connected to the base station 10 under the best reception conditions among the plurality of base stations 10 and establishes a session (Step S11).

Then, the CPU 1181 executes the counting process program 1184b to start the session timeout counting process and executes the application process program 1184d to start the application process (Step S12).

Then, the CPU 1181 executes the handover process program 1184a and determines whether the current reception conditions are bad (Step S13).

If it is determined in Step S13 that the current reception conditions are not bad (Step S13; No), the CPU 1181 repeatedly performs Step S13.

If it is determined in Step S13 that the current reception conditions are bad (Step S13; Yes), the CPU 1181 selects the base station 10 with the best reception conditions from the plurality of base stations 10 (Step S14).

Then, the CPU 1181 executes the start signal transmission program 1181a1 included in the handover process program 1184a and transmits (generates) the handover start signal (Step S15). When the communication between the mobile terminal 11 and the base station 10 is interrupted, an error also occurs in the server 12. Therefore, when the application process is performed, the CPU 1181 transmits the handover start signal to the server 12 in addition to the layers above the MAC layer.

Then, the CPU 1181 starts the execution of the counting process interruption/resumption program 1184c and interrupts the session timeout counting process that is being performed. In addition, the CPU 1181 starts the execution of the application process interruption/resumption program 1184e and interrupts the application process that is being performed (Step S16)

Then, the CPU 1181 performs the hard handover process to be connected to the base station 10 selected in Step S14 and establishes a session (Step S17).

When the hard handover process ends in Step S17, the CPU 1181 executes the end signal transmission program 1184a2 included in the handover process program 1184a and transmits (generates) the handover end signal (Step S18). When the handover start signal is also transmitted to the server 12 in Step S15, the CPU 1181 transmits the handover end signal to the server 12 in addition to the layers above the MAC layer.

Then, the CPU 1181 ends the execution of the counting process interruption/resumption program 1184c and resumes the interrupted session timeout counting process. In addition, the CPU 1181 ends the execution of the application process interruption/resumption program 1184e and resumes the interrupted application process (Step S19). Then, the CPU 1181 repeatedly performs the process after Step S13.

(Communication Process of Server)

Figure 8:
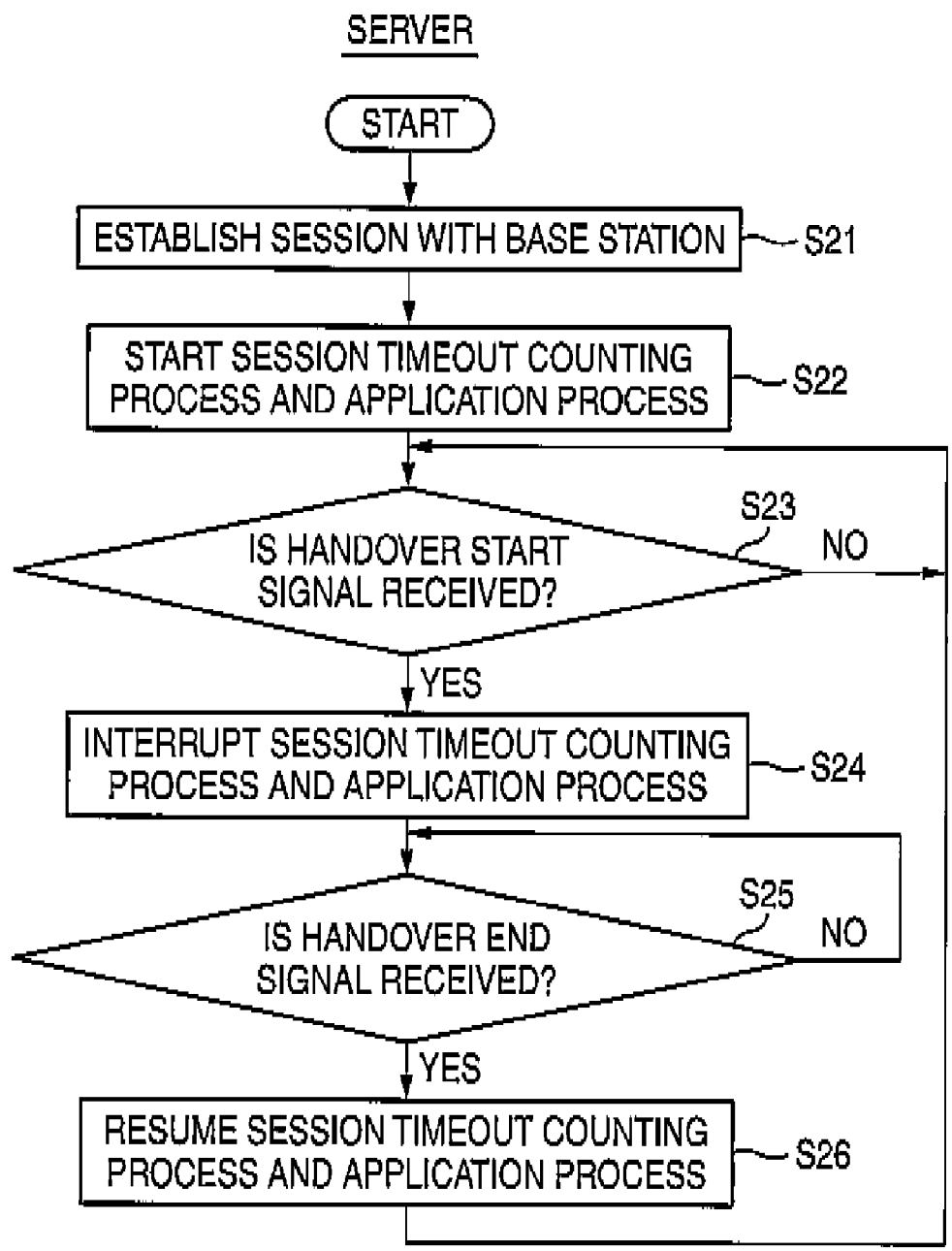
FIG. 8 is a flowchart illustrating a communication process of the server with the mobile terminal according to the first embodiment.

Next, the communication process of the server 12 with the mobile terminal 11 will be described with reference to a flowchart shown in FIG. 8.

First, the CPU 1271 of the server 12 is connected to the base station 10 connected to the mobile terminal 11 and establishes a session (Step S21).

Then, the CPU 1271 executes the counting process program 1274a to start the session timeout counting process, and executes the application process program 1274c to start the application process (Step S22).

Then, the CPU 1271 determines whether the communication unit 121 and the receiving unit 122 receive the handover start signal (Step S23).

If it is determined in Step S23 that the communication unit 121 and the receiving unit 122 do not receive the handover start signal (Step S23; No), the CPU 1271 repeatedly performs the process after Step S23.

On the other hand, if it is determined in Step S23 that the communication unit 121 and the receiving unit 122 receive the handover start signal (Step S23; Yes), the CPU 1271 starts the execution of the counting process interruption/resumption program 1274b and interrupts the session timeout counting process that is being performed. In addition, the CPU 1271 starts the execution of the application process interruption/resumption program 1274d and interrupts the application process that is being performed (Step S24).

Then, the CPU 1271 determines whether the communication unit 121 and the receiving unit 122 receive the handover end signal (Step S25).

If it is determined in Step S25 that the communication unit 121 and the receiving unit 122 do not receive the handover end signal (Step S25; No), the CPU 1271 repeatedly performs the process after Step S25.

If it is determined in Step S25 that the communication unit 121 and the receiving unit 122 receive the handover end signal (Step S25; Yes), the CPU 1271 ends the execution of the counting process interruption/resumption program 1274b and resumes the interrupted session timeout counting process. In addition, the CPU 1271 ends the execution of the application process interruption/resumption program 1274d and resumes the interrupted application process (Step S26). Then, the CPU 1271 repeatedly performs the process after Step S23.

According to the above-described first embodiment, the mobile terminal 11 includes: the handover process program 1184a that allows the CPU 1181 to perform the hard handover process; the counting process program 1184b that allows the CPU 1181 to perform the session timeout counting process which counts the time until the session established for wireless communication with the base station 10 is timed out; the counting process interruption/resumption program 1184c that allows the CPU 1181 to control the progress of the session timeout counting process performed by the CPU 1181 which has executed the counting process program 1184b; the application process program 1184d that allows the CPU 1181 to perform a predetermined application process for the mobile terminal 11; and the application process interruption/resumption program 1184e that allows the CPU 1181 to control the progress of the application process performed by the CPU 1181 that has executed the application process program 1184d. The handover process program 1184a includes: the start signal transmission program 1184a1 that allows the CPU 1181 to transmit the handover start signal indicating the start of the hard handover process before the hard handover process starts; and the end signal transmission program 1184a2 that allows the CPU 1181 to transmit the handover end signal indicating the end of the hard handover process after the hard handover process ends. The CPU 1181 executing the counting process interruption/resumption program 1184c controls the progress of the session timeout counting process performed by the CPU 1181 which has executed the counting process program 1184b such that a session timeout does not occur during the period from the reception of the handover start signal to the reception of the handover end signal. The CPU 1181 executing the application process interruption/resumption program 1184e interrupts the application process performed by the CPU 1181 which has executed the application process program 1184d during the period from the reception of the handover start signal to the reception of the handover end signal.

That is, in the mobile terminal 11, while the hard handover process is being performed, no session timeout occurs. Therefore, the existing software process is not abnormally shut down due to a session timeout. In addition, in the mobile terminal 11, while the hard handover process is being performed, the application process is interrupted. Therefore, the existing software process is not abnormally shut down due to a buffer underflow. As a result, it is possible to apply the existing software to the layers above the MAC layer that performs the handover process without any change, which results in an increase in convenience.

According to the above-described first embodiment, in the mobile terminal 11, the CPU 1181 executing the counting process interruption/resumption program 1184c interrupts the session timeout counting process performed by the CPU 1181 that has executed the counting process program 1184b during the period from the reception of the handover start signal to the reception of the handover end signal. That is, in the mobile terminal 11, the session timeout process is interrupted while the hard handover process is being performed. Therefore, it is possible to reliably prevent the occurrence of the session timeout, which is preferable.

According to the above-described first embodiment, the server 12 includes: the counting process program 1274a that allows the CPU 1271 to perform the counting process which counts the time until the session established for communication with the base station 10 is timed out; the counting process interruption/resumption program 1274b that allows the CPU 1271 to control the progress of the session timeout counting process performed by the CPU 1271 which has executed the counting process program 1274a; the application process program 1274c that allows the CPU 1271 to perform a predetermined application process for the server 12; and the application process interruption/resumption program 1274d that allows the CPU 1271 to control the progress of the application process performed by the CPU 1271 which has executed the application process program, 1274c. The CPU 1271 executing the counting process interruption/resumption program, 1274b controls the progress of the session timeout counting process performed by the CPU 1271 which has executed the counting process program 1274a such that no session timeout occurs during the period from the reception of the handover start signal to the reception of the handover end signal by the communication unit 121 and the receiving unit 122. The CPU 1271 executing the application process interruption/resumption program 1274d interrupts the application process performed by the CPU 1271 which has executed the application process program 1274c during the period from the reception of the handover start signal to the reception of the handover end signal by the communication unit 121 and the receiving unit 122.

That is, in the server 12, no session timeout occurs during the period from the reception of the handover start signal to the reception of the handover end signal (while the mobile terminal 11 is performing the hard handover process). Therefore, the existing software process is not abnormally shut down due to a session timeout. In the server 12, the application process is interrupted during the period from the reception of the handover start signal to the reception of the handover end signal. Therefore, the existing software process is not abnormally shut down due to, for example, a buffer overflow. As a result, it is possible to use the existing software without any change, which results in an increase in convenience.

According to the above-described first embodiment, in the server 12, the CPU 1271 executing the counting process interruption/resumption program 1274b interrupts the session timeout counting process performed by the CPU 1271 that has executed the counting process program 1274a during the period from the reception of the handover start signal to the reception of the handover end signal by the communication unit 121 and the receiving unit 122.

That is, in the server 12, the session timeout process is interrupted during the period from the reception of the handover start signal to the reception of the handover end signal. Therefore, it is possible to reliably prevent the occurrence of a session timeout, which is preferable.

[Second Embodiment]

Next, a mobile terminal 21, a server 22, and a communication system 2 according to a second embodiment will be described. The second embodiment differs from the first embodiment in a method of counting the time until a session is timed out. Specifically, in the first embodiment, while the mobile terminal 11 performs the hard handover process, the counting of the time until the session is timed out is interrupted. However, in the second embodiment, even while the mobile terminal 11 performs the hard handover process, the time until the session is timed out is counted. Therefore, in the second embodiment, only the components different from those in the first embodiment will be described. The same components as those in the first embodiment are denoted by the same reference numerals and a detailed description thereof will be omitted.

<Communication System>

Figure 9:
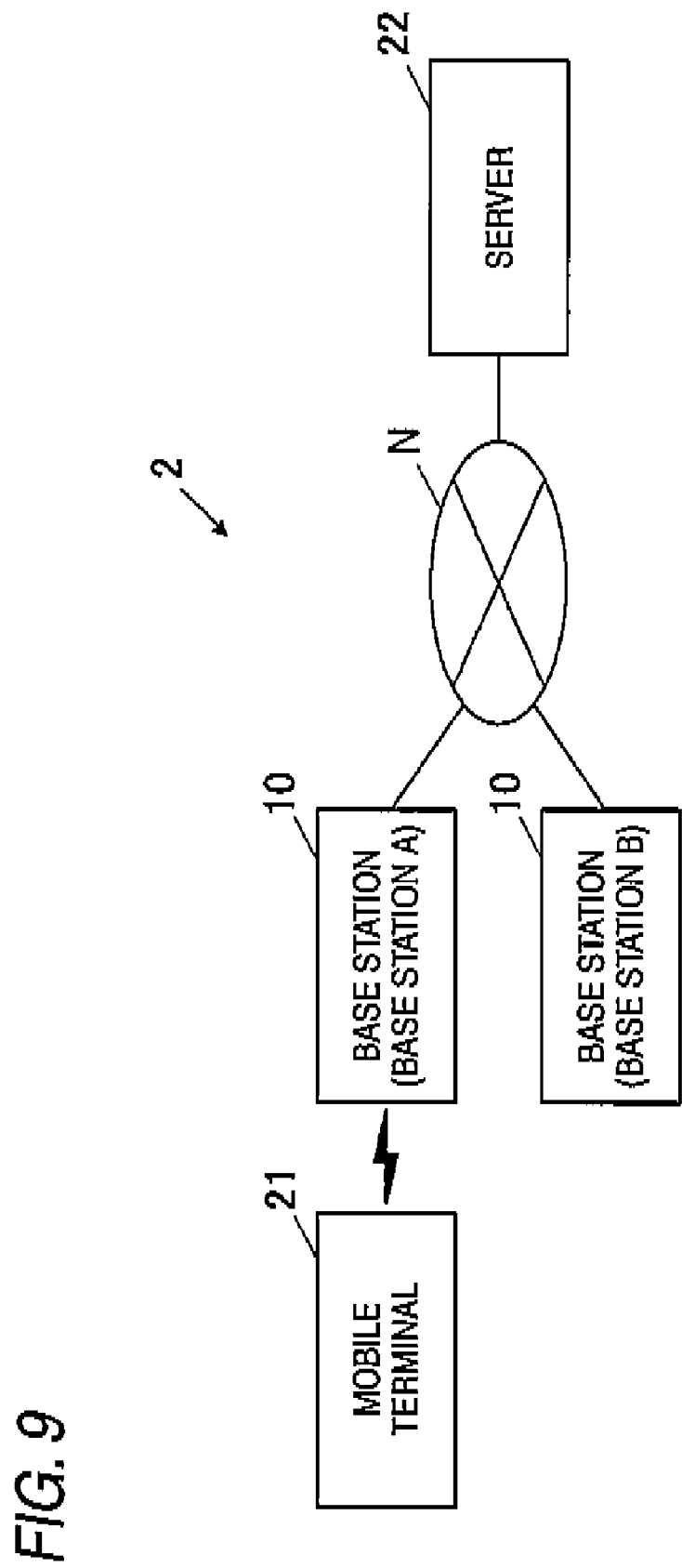
FIG. 9 is a diagram illustrating the structure of a communication system according to a second embodiment.

As shown in FIG. 9, the communication system 2 includes, for example, a plurality of base stations 10, a mobile terminal 21 that performs wireless communication (mobile WiMAX communication) with one base station 10 connected thereto among the plurality of base stations 10, and a server 22 that is connected to the plurality of base stations 10 through a network N, such as a WAN (Wide Area Network), and distributes content to the mobile terminal 21 through the network N and the base station 10.

<Mobile Terminal>

Figure 10:
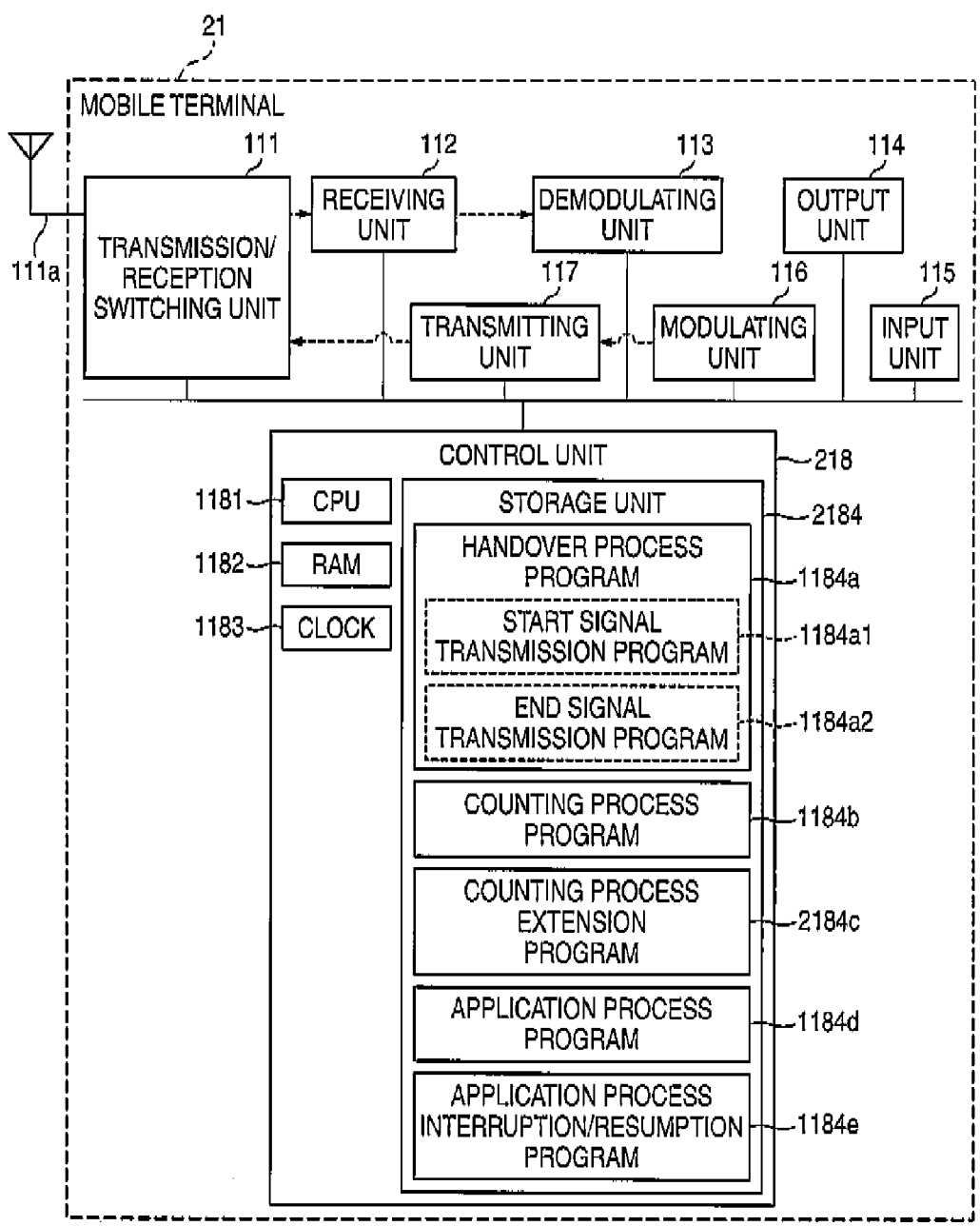
FIG. 10 is a diagram illustrating the functional structure of a mobile terminal according to the second embodiment.
Figure 11:
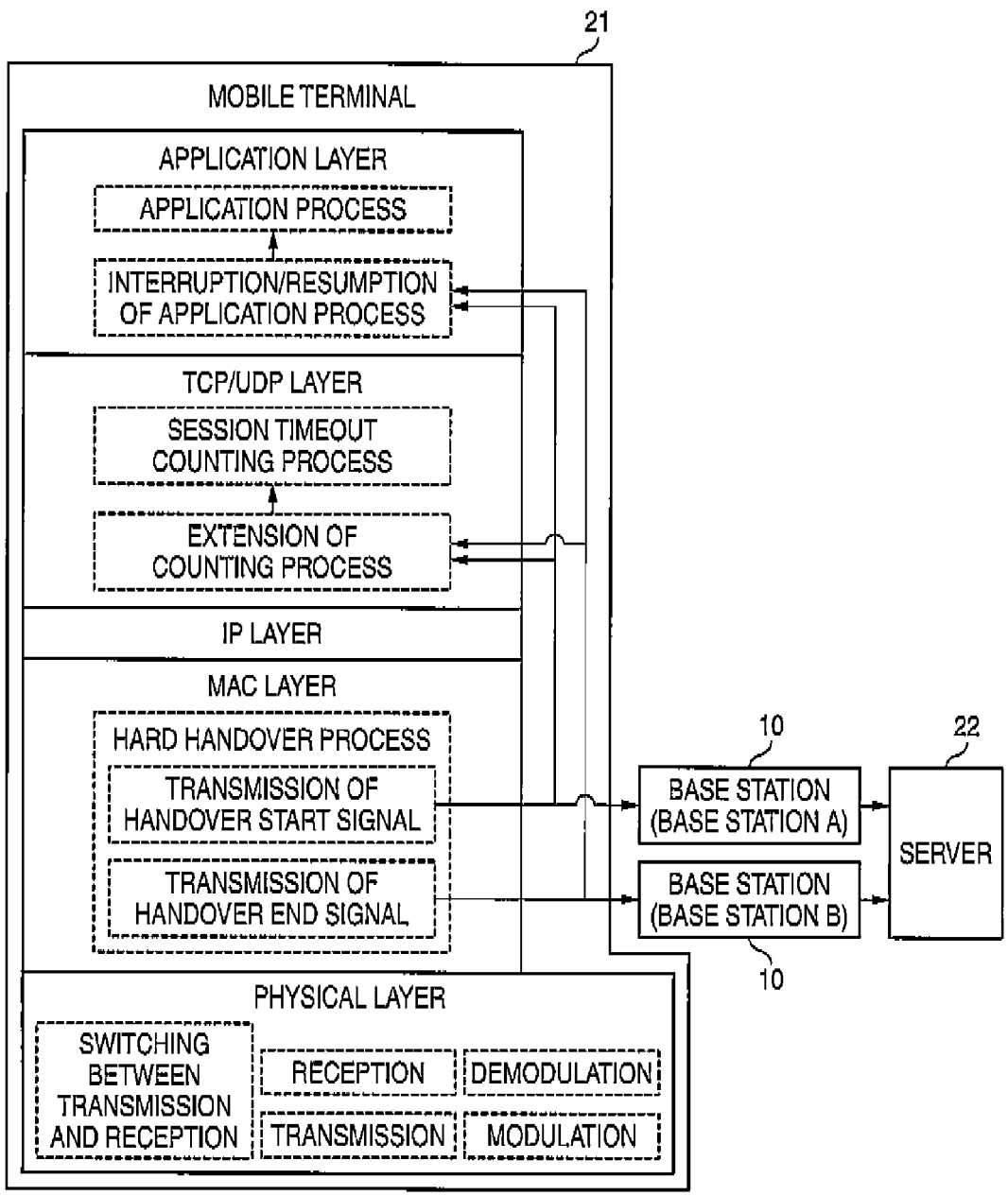
FIG. 11 is a diagram illustrating the layer structure of the mobile terminal according to the second embodiment.

As shown in FIG. 10, the mobile terminal 21 includes, for example, a transmission/reception switching unit 111 including an antenna 111a, a receiving unit 112, a demodulating unit 113, an output unit 114, an input unit 115, a modulating unit 116, a transmitting unit 117, and a control unit 218. In the mobile terminal 21, for example, as shown in FIGS. 10 and 11, the transmission/reception switching unit 111, the receiving unit 112, the demodulating unit 113, the modulating unit 116, and the transmitting unit 117 perform a process corresponding to the physical layer, and the control unit 218 performs processes corresponding to the MAC layer, the IP layer, the TCP/UDP layer, and the application layer.

For example, as shown in FIG. 10, the control unit 218 includes a CPU 1181, a RAM 1182, a clock 1183, and a storage unit 2184.

For example, as shown in FIG. 10, the storage unit 2184 stores a handover process program 1184a, a counting process program 1184b, a counting process extension program 2184c, an application process program 1184d, and an application process interruption/resumption program 1184e. The handover start signal transmitted by the CPU 1181 which has executed a start signal transmission program 1184a1 included in the handover process program 1184a and the handover end signal transmitted by the CPU 1181 which has executed an end signal transmission program 1184a2 included in the handover process program 1184a are transmitted to the CPU 1181 executing a counting process extension program 2184c or the CPU 1181 executing the application process interruption/resumption program 1184e (or, the CPU 1181 executing a counting process extension program 2184c or the CPU 1181 executing the application process interruption/resumption program 1184e, and the server 12).

The counting process extension program 2184c (counting process extension daemon) allows the CPU 1181 to perform a function of controlling the progress of the session timeout counting process performed by the CPU 1181 which has executed the counting process program 1184b. Specifically, the CPU 1181 controls the progress of the session timeout counting process performed by the CPU 1181 which has executed the counting process program 1184b such that no session timeout occurs during the period from the reception of the handover start signal to the reception of the handover end signal.

More specifically, the CPU 1181 extends the time until the session is timed out during the period from the generation of the handover start signal to the generation of the handover end signal. That is, the CPU 1181 starts the execution of the counting process extension program 2184c and extends the time until the session is timed out, using the generation of the handover start signal as a trigger. In addition, the CPU 1181 ends the execution of the counting process extension program 2184c and ends the process of extending the time until the session is timed out, using the generation of the handover end signal as a trigger.

Here, the sentence "the CPU 1181 extends the time until the session is timed out" means that a time period longer than the time period from that time until the session is timed out is set. While the hard handover process is being performed, the CPU 1181 executing the counting process program 1184b performs the session timeout counting process to count the time until the session is timed out. While the hard handover process is performed, t the time until the session is timed out is extended. Therefore, during the hard handover process, even though the session timeout counting process is not interrupted, there is no time until the session is timed out. Therefore, no error occurs due to the session timeout, which is preferable. The CPU 1181 executes the counting process extension program 2184c to function as a terminal-side counting process control unit.

<Server>

Figure 12:
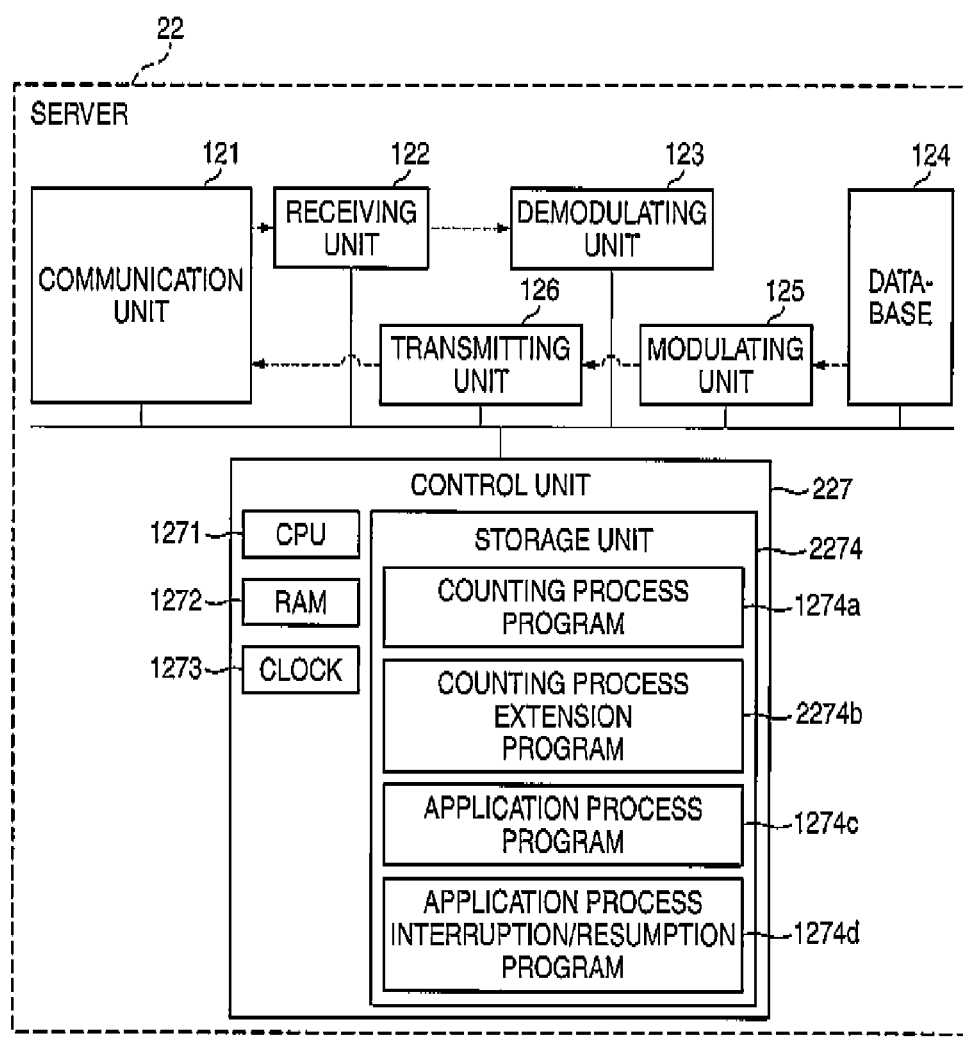
FIG. 12 is a diagram illustrating the functional structure of a server according to the second embodiment.
Figure 13:
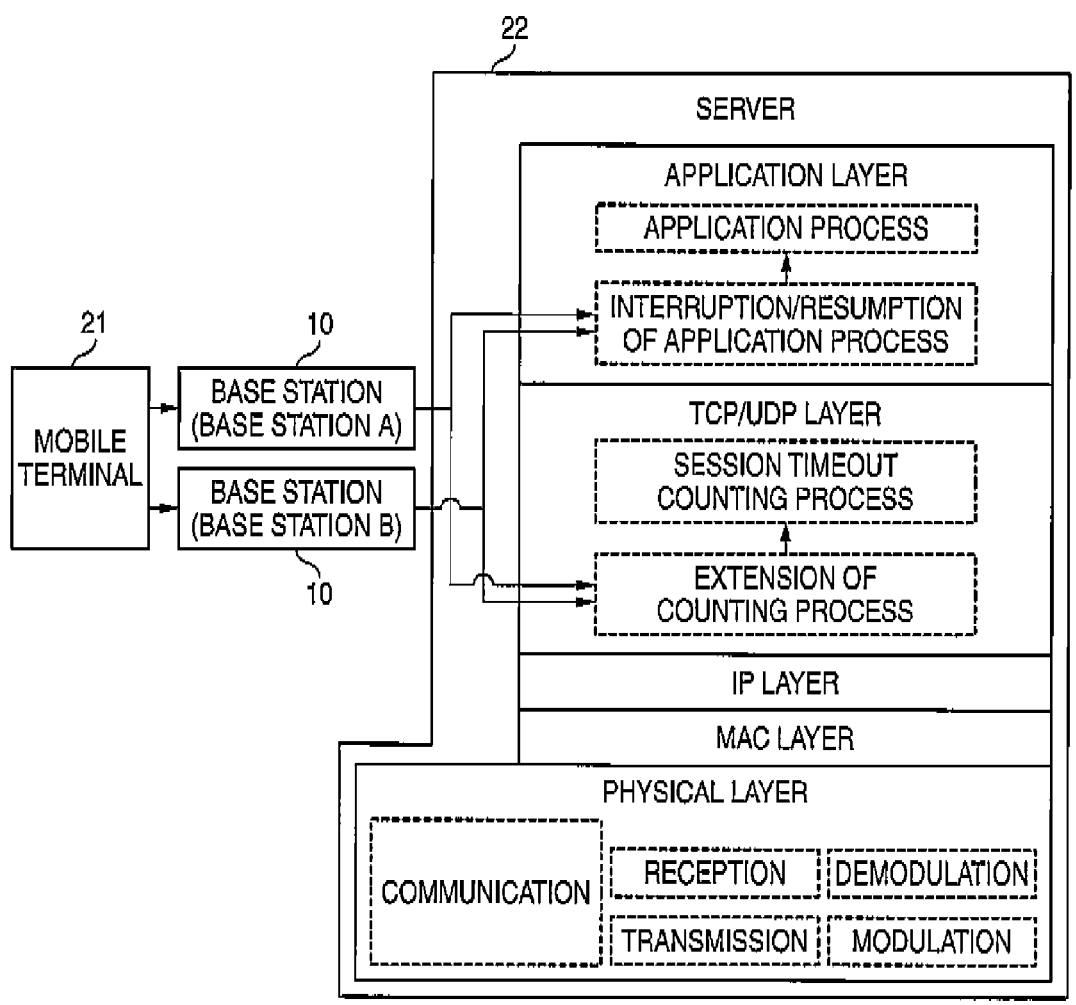
FIG. 13 is a diagram illustrating the layer structure of the server according to the second embodiment.

For example, as shown in FIG. 12, the server 22 includes a communication unit 121, a receiving unit 122, a demodulating unit 123, a data base 124, a modulating unit 125, a transmitting unit 126, and a control unit 227. In the server 22, for example, as shown in FIGS. 12 and 13, the communication unit 121, the receiving unit 122, the demodulating unit 123, the modulating unit 125, and the transmitting unit 126 perform a process corresponding to the physical layer, and the control unit 227 performs processes corresponding to the MAC layer, the IP layer, the TCP/UDP layer, and the application layer.

For example, as shown in FIG. 12, the control unit 227 includes a CPU 1271, a RAM 1272, a clock 1273, and a storage unit 2274.

For example, as shown in FIG. 12, the storage unit 2274 stores a counting process program 1274a, a counting process extension program 2274b, an application process program 1274c, and an application process interruption/resumption program 1274d.

The counting process extension program 2274b (counting process extension daemon) allows the CPU 1271 to perform a function of controlling the progress of the session timeout counting process performed by the CPU 1271 that has executed the counting process program 1274a. Specifically, the CPU 1271 controls the progress of the session timeout counting process performed by the CPU 1271 that has executed the counting process program 1274a during the period from the reception of the handover start signal and the reception of the handover end signal by the communication unit 121 and the receiving unit 122.

More specifically, the CPU 1271 extends the time until the session is timed out during the period from the reception of the handover start signal and the reception of the handover end signal by the communication unit 121 and the receiving unit 122. That is, the CPU 1271 starts the execution of the counting process extension program 2184c and starts a process of extending the time until the session is timed out, when the handover start signal generated in the mobile terminal 11 is received by the communication unit 121 and the receiving unit 122 and is then input to the control unit 227. In addition, the CPU 1271 ends the execution of the counting process extension program 2274b and ends the process of extending the time until the session is timed out, when the handover end signal generated in the mobile terminal 11 is received by the communication unit 121 and the receiving unit 122 and is then input to the control unit 227.

During the period from the reception of the handover start signal and the reception of the handover end signal by the communication unit 121 and the receiving unit 122, the CPU 1271 that has executed the counting process program 1274a performs the session timeout counting process to count the time until the session is timed out. During the period from the reception of the handover start signal and the reception of the handover end signal, the time until the session is timed out is extended. Therefore, during the period from the reception of the handover start signal and the reception of the handover end signal, even though the session timeout counting process is interrupted, there is no time until the session is timed out. As a result, therefore, no error occurs due to the session timeout, which is preferable.

The CPU 1271 executes the counting process extension program 2274b to function as a server-side counting process control unit.

<Communication Process>

Next the communication process of the communication system 2 will be described.

(Communication Process of Mobile Terminal)

Figure 14:
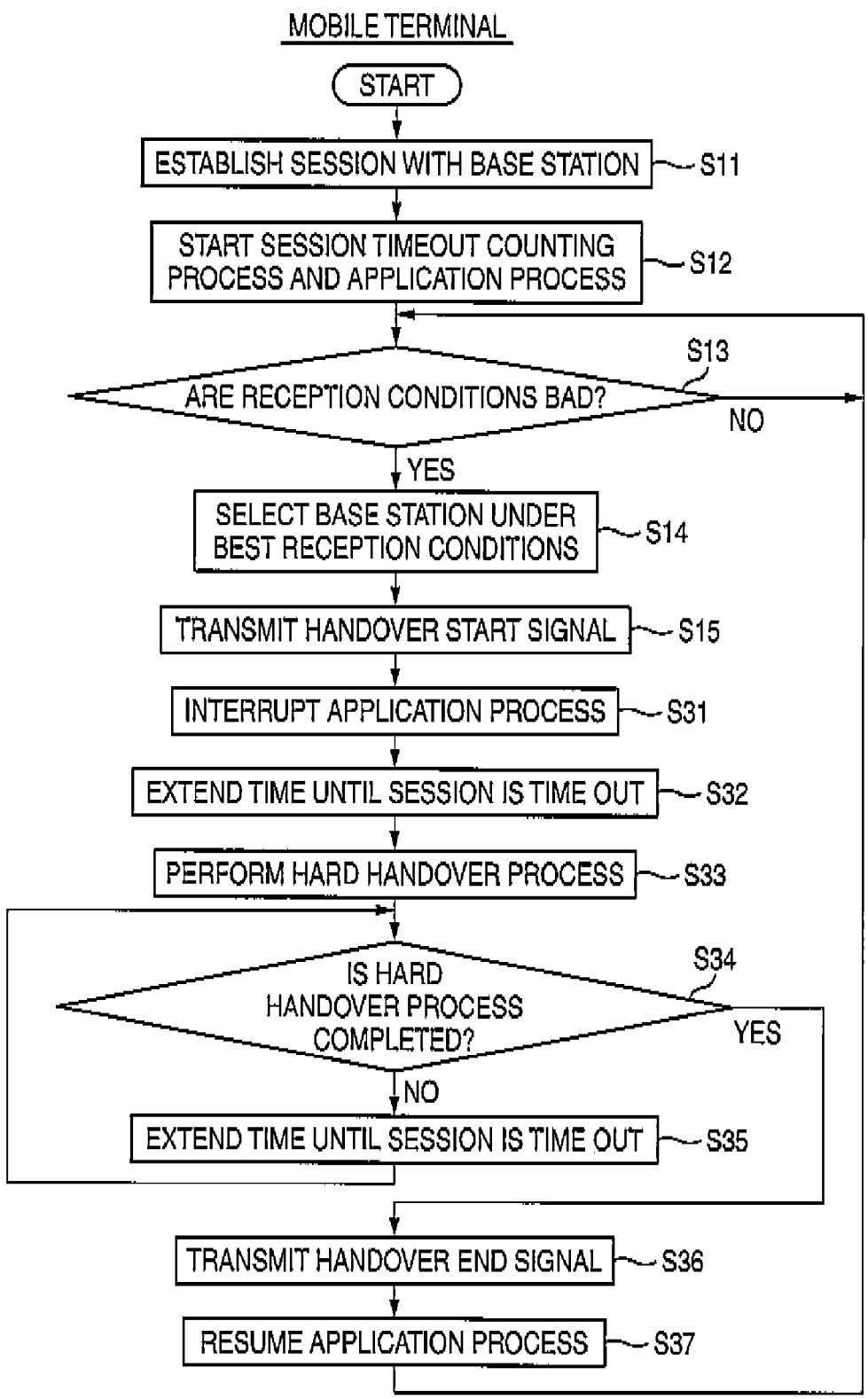
FIG. 14 is a flowchart illustrating a communication process of the mobile terminal with the server according to the second embodiment.
Figure 15:
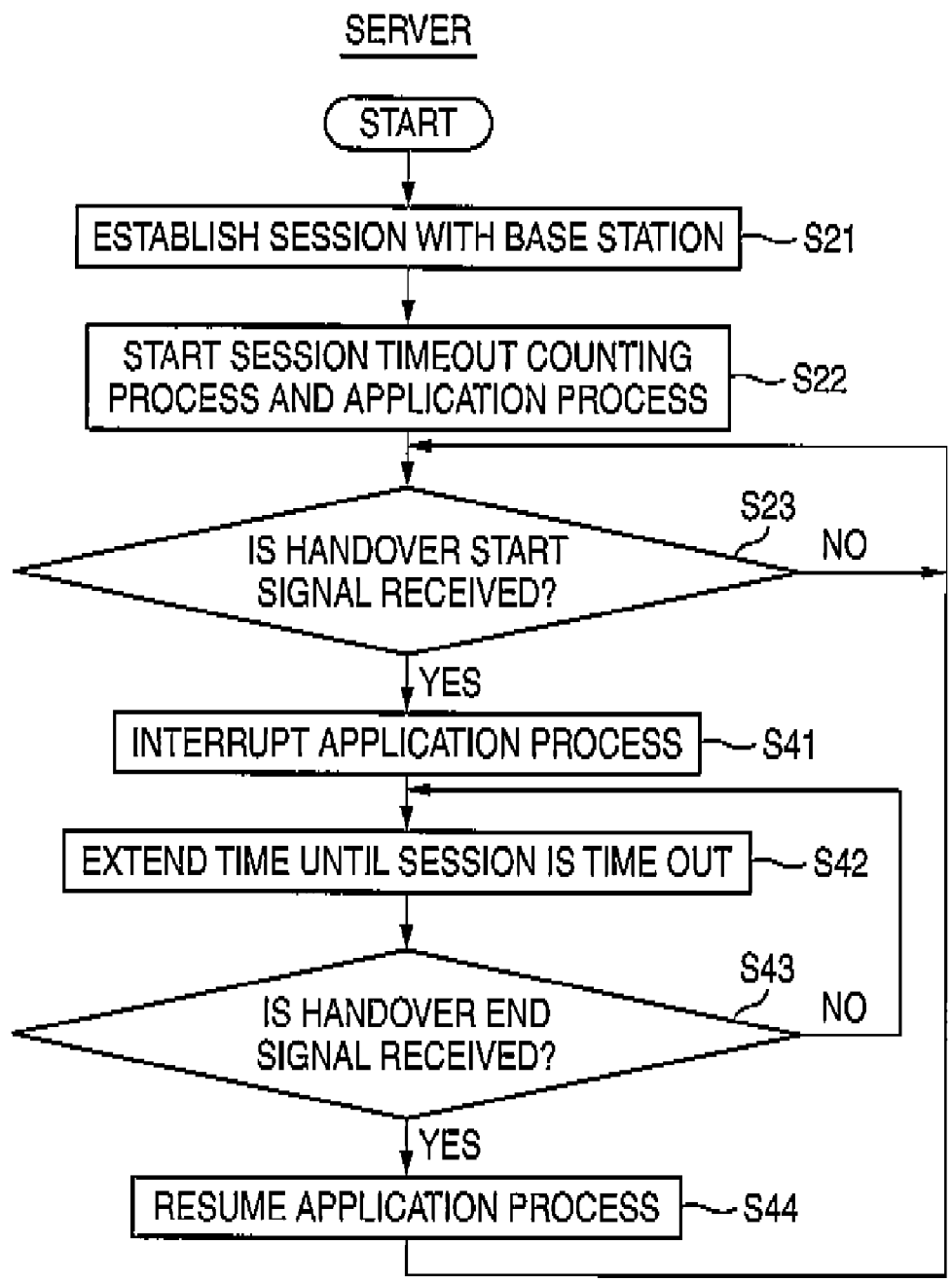
FIG. 15 is a flowchart illustrating a communication process of the server with the mobile terminal according to the second embodiment.

First, the communication process of the mobile terminal 21 with the server 22 will be described with reference to a flowchart shown in FIG. 14.

First, the CPU 1181 of the mobile terminal 21 performs Steps S11 to S15 in the communication process (FIG. 7) of the mobile terminal 11 according to the first embodiment.

Then, the CPU 1181 starts the execution of the application process interruption/resumption program 1184e and interrupts the application process (Step S31). In addition, the CPU 1181 executes the counting process extension program 2184c and extends the time until the session is timed out (Step S32).

Then, the CPU 1181 performs the hard handover process, is connected to the base station 10 selected in Step S14, and establishes a session (Step S33).

Then, the CPU 1181 determines whether the hard handover process in Step S33 ends (Step S34).

In Step S34, if it is determined in Step S33 that the hard handover process does not end, the CPU 1181 performs the counting process extension program 2184c and extends (re-extends) the time until the session is timed out (Step S35).

Specifically, when the time until the session is timed out is extended in Step S32, the CPU 1181 extends the time until the session is timed out by setting a time obtained by adding the time required from Step S32 to Step S35 or more to the time until the session is timed out from the execution of Step S32. More specifically, it is determined in Step S34 that the hard handover process does not end after Step S32 is performed, Step S35 is not performed. For example, when the time required from Step S32 to Step S35 is 10 seconds and the time until the session is timed out from the start of Step S32 is 2 minutes and 30 seconds, the time until the session is timed out is extended by setting a time (2 minutes and 50 seconds) obtained by adding the time required (for example, 20 seconds) or more to the time until the session is timed out from the execution of Step S32.

When the time until the session is timed out is extended in Step S35, the CPU 1181 extends the time until the session is timed out by setting a time obtained by adding the time until Step S35 is performed again from the execution of Step S35 or more to the time until the session is timed out from the execution of Step S35. More specifically, it is determined in Step S34 that the hard handover process does not end after Step S35 is performed, Step S35 is performed again. For example, when the time until Step S35 is performed again from the execution of Step S35 is 5 seconds and the time until the session is timed out from the execution of Step S35 is 2 minutes and 30 seconds, the time until the session is timed out is extended by setting a time (2 minutes and 40 seconds) obtained by adding the time required (for example, 10 seconds) or more to the time until the session is timed out from the execution of Step S35. When the time until the session is timed out is extended in Step S32 or Step S35 in this way, there is no time until the session is timed out even though the session timeout counting process is interrupted during the hard handover process. Therefore, no error occurs due to the session timeout.

On the other hand, if it is determined in Step S34 that the hard handover process in Step S33 ends, the CPU 1181 performs the end signal transmission program 1184a2 included in the handover process program 1184a to transmit (generate) the handover end signal (Step S36). When the handover start signal is also transmitted to the server 12 in Step S15, the CPU 1181 transmits the handover end signal to the server 12 in addition to the layers above the MAC layer.

Then, the CPU 1181 ends the execution of the application process interruption/resumption program 1184e and resumes the interrupted application process (Step S37), thereby repeatedly performing the process after Step S13.

(Communication Process of Server)

Next, the communication process of the server 22 with the mobile terminal 21 will be described with reference to a flowchart shown in FIG. 16.

First, the CPU 1271 of the server 22 performs Steps S21 to S23 in the communication process (FIG. 8) of the server 12 according to the first embodiment.

If it is determined in Step S23 that the communication unit 121 and the receiving unit 122 receive the handover start signal (Step S23; Yes), the CPU 1271 starts the execution of the application process interruption/resumption program 1274d and interrupts the application process that is being performed (Step S41). In addition, the CPU 1271 performs the counting process extension program 2274b and extends the time until the session is timed out (Step S42). When the time until the session is timed out is extended in Step S42, the CPU 1271 extends the time until the session is timed out by setting a time obtained by adding the time until Step S42 is performed again from the execution of Step S42 or more to the time until the session is timed out from the execution of Step S42. More specifically, it is determined in Step S43 that the handover end signal is not received after Step S42 is performed, Step S42 is performed again. For example, when the time until Step S42 is performed again from the execution of Step S42 is 5 seconds and the time until the session is timed out from the execution of Step S42 is 2 minutes and 30 seconds, the time until the session is timed out is extended by setting a time (2 minutes and 40 seconds) obtained by adding the time required (for example, 10 seconds) or more to the time until the session is timed out from the execution of Step S42. When the time until the session is timed out is extended in Step S42 in this way, there is no time until the session is timed out even though the session timeout counting process is interrupted during the hard handover process. Therefore, no error occurs due to the session timeout.

Then, the CPU 1271 determines whether the communication unit 121 and the receiving unit 122 receive the handover end signal (Step S43).

If it is determined in Step S43 that the communication unit 121 and the receiving unit 122 do not receive the handover end signal (Step S43; No), the CPU 1271 repeatedly performs the process after Step S42.

If it is determined in Step S43 that the communication unit 121 and the receiving unit 122 receive the handover end signal (Step S43; Yes), the CPU 1271 ends the execution of the application process interruption/resumption program 1274d and resumes the interrupted application process (Step S44), thereby repeatedly performing the process after Step S23.

According to the above-described second embodiment, in the mobile terminal 21, the CPU 1181 that has executed the counting process extension program 2184c extends the time until the session is timed out during the period from the reception of the handover start signal to the reception of the handover end signal. That is, in the mobile terminal 21, while the hard handover process is being performed, the time until the session is timed out is extended to prevent a session timeout. Therefore, it is possible to reliably prevent the occurrence of the session timeout, which is preferable.

According to the above-described second embodiment, in the server 22, the CPU 1271 that has executed the counting process extension program 2274b extends the time until the session is timed out during the period from the reception of the handover start signal to the reception of the handover end signal by the server 22. That is, in the server 22, the time until the session is timed out is extended to prevent a session timeout during the period from the reception of the handover start signal to the reception of the handover end signal. Therefore, it is possible to reliably prevent the occurrence of the session timeout, which is preferable.

The invention is not limited to the above-described embodiments, but various modifications and changes of the invention can be made without departing from the scope and spirit of the invention.

The wireless communication of the mobile terminal 11 with the base station 10 is not limited to the mobile WiMAX communication, but any wireless communication system may be used as long as it can perform the hard handover process to switch the base stations 10.

The invention can be applied to, for example, the field of communication. For example, the invention can be applied to a mobile terminal that performs the hard handover process to switch the base stations, a server that distributes content to the mobile terminal, and communication system including the mobile terminal and the sewer.

What is claimed is:

1. A mobile terminal which is configured to perform a hard handover process to switch a base station to which the mobile terminal is connected from among a plurality of base stations and to perform wireless communication with the base station to which the mobile terminal is connected, the mobile terminal comprising:
   a handover processing section configured to perform the hard handover process;
   a terminal-side counting section configured to perform a counting process for counting time until a session established for wireless communication with the base station is timed out;
   a terminal-side counting process controlling section configured to control the progress of the counting process by the terminal-side counting section;
   a terminal-side application processing section configured to perform a predetermined application process for the mobile terminal; and
   a terminal-side application process controlling section configured to control the progress of the application process by the terminal-side application processing section,
   wherein the handover processing section includes:
      a start signal transmitting section configured to transmit a handover start signal indicating the start of the hard handover process to the terminal-side counting process controlling section and the terminal-side application process controlling section before the hard handover process starts; and
      an end signal transmitting section configured to transmit a handover end signal indicating the end of the hard handover process to the terminal-side counting process controlling section and the terminal-side application process controlling section after the hard handover process ends,
   wherein the terminal-side counting process controlling section controls the progress of the counting process by the terminal-side counting section such that the timeout does not occur during a period from receiving the handover start signal transmitted from the start signal transmitting section to receiving the handover end signal transmitted from the end signal transmitting section, and
   wherein the terminal-side application process controlling section interrupts the application process by the terminal-side application processing section during the period from receiving the handover start signal transmitted from the start signal transmitting section to receiving the handover end signal transmitted from the end signal transmitting section.

2. The mobile terminal as set forth in claim 1, wherein the terminal-side counting process controlling section interrupts the counting process by the terminal-side counting section during the period from receiving the handover start signal transmitted from the start signal transmitting section to receiving the handover end signal transmitted from the end signal transmitting section.

3. The mobile terminal as set forth in claim 1, wherein the terminal-side counting process controlling section extends the time until the session is timed out during the period from receiving the handover start signal transmitted from the start signal transmitting section to receiving the handover end signal transmitted from the end signal transmitting section.

4. A server which is connectable to a plurality of base stations through a network and configured to communicate with a base station to which a mobile terminal is connected to distribute a content to the mobile terminal through the base station, the mobile terminal configured to perform a hard handover process to switch the base station to which the mobile terminal is connected from among the base stations, the server comprising:

a receiving section configured to receive a handover start signal indicating the start of the hard handover process and a handover end signal indicating the end of the hard handover process, which are transmitted from the mobile terminal;

a server-side counting section configured to perform a counting process for counting time until a session established for communication with the base station to which the mobile terminal is connected is timed out;

a server-side counting process controlling section configured to control the progress of the counting process by the server-side counting section;

a server-side application processing section configured to perform a predetermined application process for the server; and a server-side application process controlling section configured to control the progress of the application process by the server-side application processing section, wherein the server-side counting process controlling section controls the progress of the counting process by the server-side counting section such that the timeout does not occur during a period from when the receiving section receives the handover start signal to when the receiving section receives the handover end signal, and wherein the server-side application process controlling section interrupts the application process by the server-side application processing section during the period from when the receiving section receives the handover start signal to when the receiving section receives the handover end signal.

5. The server as set forth in claim 4, wherein the server-side counting process controlling section interrupts the counting process by the server-side counting section during the period from when the receiving section receives the handover start signal to when the receiving section receives the handover end signal.

6. The server as set forth in claim 4, wherein the server-side counting process controlling section extends the time until the session is timed out during the period from when the receiving section receives the handover start signal to when the receiving section receives the handover end signal.

7. A communication system comprising:

a plurality of base stations;

a mobile terminal which is configured to perform a hard handover process to switch a base station to which the mobile terminal is connected from among the base stations and to perform wireless communication with the base station to which the mobile terminal is connected; and a server which is connectable to the base stations through a network and configured to communicate with the base station to which the mobile terminal is connected to distribute a content to the mobile terminal through the base station, wherein the mobile terminal includes:

a handover processing section configured to perform the hard handover process;

a terminal-side counting section configured to perform a first counting process for counting time until a session established for wireless communication with the base station is timed out;

a terminal-side counting process controlling section configured to control the progress of the first counting process by the terminal-side counting section;

a terminal-side application processing section configured to perform a first application process for the mobile terminal; and a terminal-side application process controlling section configured to control the progress of the first application process by the terminal-side application processing section, wherein the handover processing section includes:

a start signal transmitting section configured to transmit a handover start signal indicating the start of the hard handover process to the terminal-side counting process controlling section, the terminal-side application process controlling section and the server before the hard handover process starts; and an end signal transmitting section configured to transmit a handover end signal indicating the end of the hard handover process to the terminal-side counting process controlling section, the terminal-side application process controlling section and the server after the hard handover process ends, wherein the terminal-side counting process controlling section controls the progress of the first counting process by the terminal-side counting section such that the timeout does not occur during a period from receiving the handover start signal transmitted from the start signal transmitting section to receiving the handover end signal transmitted from the end signal transmitting section, wherein the terminal-side application process controlling section interrupts the first application process by the terminal-side application processing section during the period from receiving the handover start signal transmitted from the start signal transmitting section to receiving the handover end signal transmitted from the end signal transmitting section, wherein the server includes:

a receiving section configured to receive the handover start signal transmitted from the start signal transmitting section and the handover end signal transmitted from the end signal transmitting section;

a server-side counting section configured to perform a second counting process for counting time until a session established for communication with the base station to which the mobile terminal is connected is timed out;

a server-side counting process controlling section configured to control the progress of the second counting process by the server-side counting section;

a server-side application processing section configured to perform a second application process for the server; and a server-side application process controlling section configured to control the progress of the second application process by the server-side application processing section, wherein the server-side counting process controlling section controls the progress of the second counting process by the server-side counting section such that the timeout does not occur during a period from when the receiving section receives the handover start signal to when the receiving section receives the handover end signal, and wherein the server-side application process controlling section interrupts the second application process by the server-side application processing section during the period from when the receiving section receives the handover start signal to when the receiving section receives the handover end signal.

* * * * *